United States Patent
Al-Shuhail et al.

(10) Patent No.: US 10,401,489 B2
(45) Date of Patent: *Sep. 3, 2019

(54) METHOD FOR DRILLING AND CHARACTERIZING SUBSURFACE POROSITY

(71) Applicant: King Fahd University of Petroleum and Minerals, Dhahran (SA)

(72) Inventors: Abdullatif A. Al-Shuhail, Dhahran (SA); Fathi M. Abdullah, Taiz (YE)

(73) Assignee: King Fahd University of Petroleum and Minerals, Dhahran (SA)

( * ) Notice: Subject to any disclaimer, the term of this patent is extended or adjusted under 35 U.S.C. 154(b) by 28 days.

This patent is subject to a terminal disclaimer.

(21) Appl. No.: 15/944,158

(22) Filed: Apr. 3, 2018

(65) Prior Publication Data

US 2018/0292524 A1 Oct. 11, 2018

Related U.S. Application Data

(63) Continuation of application No. 14/697,394, filed on Apr. 27, 2015, now Pat. No. 9,977,124.

(51) Int. Cl.
| | |
|---|---|
| *G01S 13/88* | (2006.01) |
| *G01V 3/12* | (2006.01) |
| *G01V 7/00* | (2006.01) |
| *G01S 7/41* | (2006.01) |
| *G01S 13/86* | (2006.01) |

(52) U.S. Cl.
CPC ............. *G01S 13/885* (2013.01); *G01S 7/41* (2013.01); *G01S 13/86* (2013.01); *G01V 3/12* (2013.01); *G01V 7/00* (2013.01)

(58) Field of Classification Search
CPC ............ G01S 13/88; G01S 13/86; G01S 7/41; G01V 3/12; G01V 7/00
See application file for complete search history.

(56) References Cited

U.S. PATENT DOCUMENTS

| | | | |
|---|---|---|---|
| 8,775,083 B2 | 7/2014 | Young et al. | |
| 2010/0259438 A1 | 10/2010 | Jones | |

OTHER PUBLICATIONS

R. L. Roberts, W. J. Hinze, D. I. Leap. "Application of the Gravity Method to Investigation of a Landfill in the Glaciated Midcontinent, U.S.A." http://gravmag.ou.edu/examples/thomas/, accessed Sep. 22, 2014.

Julien Guillemoteau, Maksim Bano, Jean-Remi Dujardin. "Influence of grain size, shape and compaction on georadar waves: example of an Aeolian dune." Published in Geophysical Journal International (2012), vol. 190, p. 1455-1463.

*Primary Examiner* — Manuel L Barbee

(74) *Attorney, Agent, or Firm* — Oblon, McClelland, Maier & Neustadt, L.L.P.

(57) ABSTRACT

A system and associated methodology determines the porosity and water saturation of a cavity using a joint inversion of gravity and ground penetrating radar data. The system exhibits high accuracy. In one embodiment, the cavity is spherical.

9 Claims, 28 Drawing Sheets

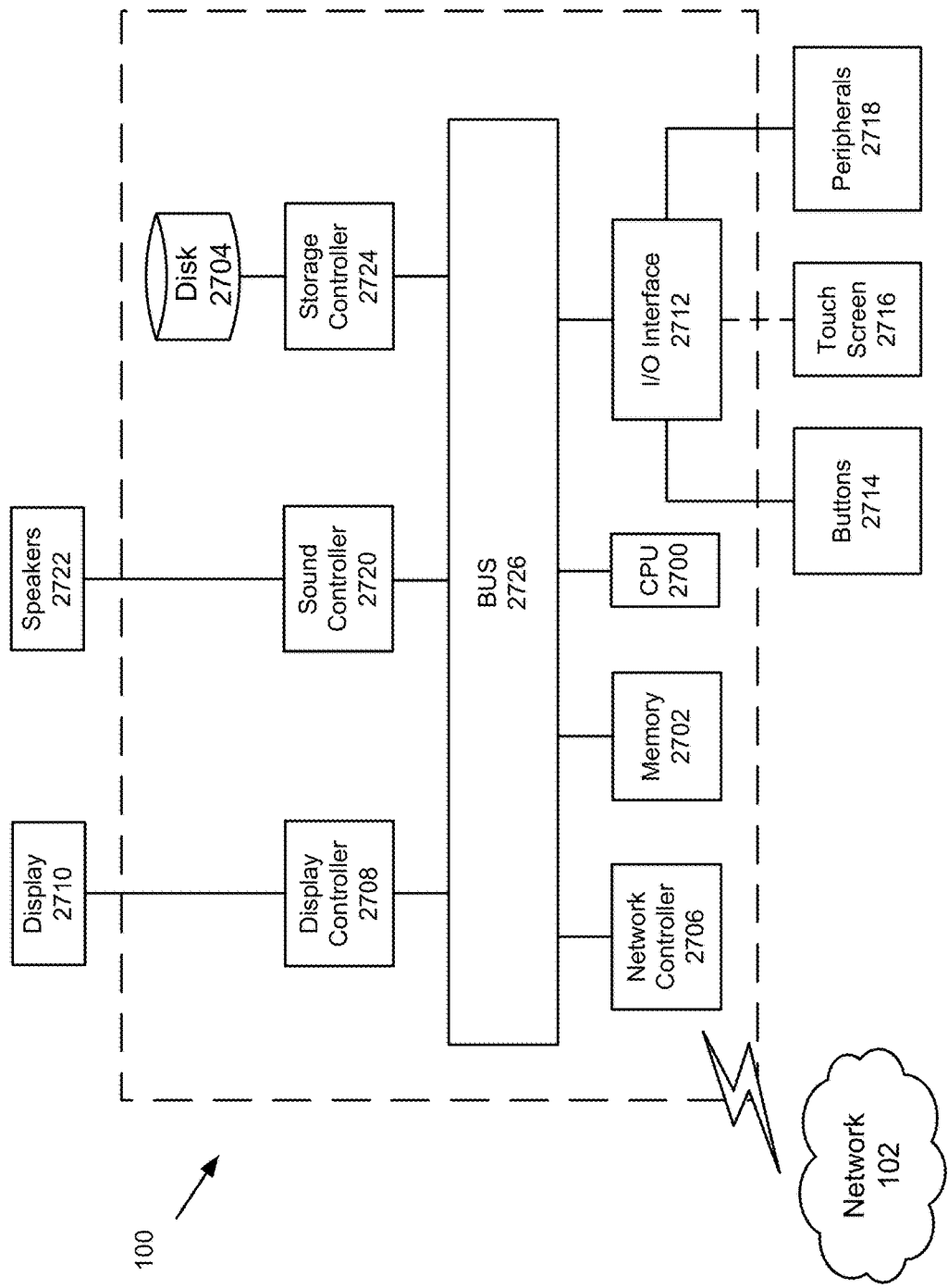

METHOD FOR DRILLING AND CHARACTERIZING SUBSURFACE POROSITY

CROSS REFERENCE TO RELATED APPLICATIONS

The present application is a Continuation of Ser. No. 14/697,394, allowed, having a filing date of Apr. 27, 2015.

TECHNICAL FIELD

The present disclosure relates to methods and systems for characterization of subsurface cavities.

BACKGROUND

Geophysics improves our understanding of subsurface geological features. During the middle of the 20th century, ground penetrating radar (GPR) and gravity methods were rapidly developed to investigate subsurface problems as described in Reynolds, J. M, An introduction to applied and environmental geophysics, Wiley, 1997. However, the last three decades have featured the most important achievements in application of both the GPR and gravity methods in several fields, such as archaeology, engineering and environmental science. The use of GPR has increased in detecting and identifying many subsurface features, such as mineshafts, pipelines, ore lodes, cavities, groundwater, and buried rock valleys as described in Chamberlain, A. T., Sellers, W., Proctor, C. and Coard, R., "Cave detection in limestone using ground penetrating radar", Journal of archaeological science, vol. 27, p. 957-964, 2000.

Subsurface cavities are hazardous due to their susceptibility to ground surface subsidence, which can cause great losses to the population that occupies the land above them as described in Benson, A. K., "Applications of ground penetrating radar in assessing some geological hazards: examples of groundwater contamination, faults, cavities", Journal of Applied Geophysics, vol. 33, p. 177-193, 1995 incorporated herein by reference in its entirety. Cavities are formed either naturally through the dissolution of limestones, dolomites, and evaporites or by human action, such as the construction of tunnels and tombs as described in Chalikakis, K., Plagnes, V., Guerin, R., Valois, R. and Bosch, F. P., "Contribution of geophysical methods to karst-system exploration: an overview", Hydrogeology journal, vol. 19, p. 1169-1180, 2011 incorporated herein by reference in its entirety. Cavities may be filled with air, water, sediments, or a combination of materials.

There are many geophysical techniques that are appropriate for detecting and/or defining cavities features in the subsurface. For instance, microgravity as described in: Butler, D. K., "Interval gravity-gradient determination concepts" Geophysics, 49, p. 828-832 1984, Bishop, I., Styles, P., Emsley, S. J., and Ferguson, N. S., "The detection of cavities using the microgravity technique: case histories from mining and karstic environments", Modern geophysics in engineering geology, geological society, Engineering geology special publication, vol. 12, p. 153-166, 1997, Styles, P., McGrath, R., Thomas, E. and Cassidy, N. J., "The use of microgravity for cavity characterization in karstic terrains", quarterly journal of engineering geology and hydrogeology, vol. 38, p. 155-169, 2005 and Panisova, J., and Pasteka, R., "The use of microgravity technique in archaeology: A case study from the St. Nicolas church in Pukanec, Slovakia" contributions to geophysics and geodesy vol. 39, p. 237-254, 2009, ground penetrating radar as described in Chamberlain, A. T., Sellers, W., Proctor, C. and Coard, R. "cave detection in Limestone using ground penetrating radar", Journal of Archaeological science, vol. 27, p. 957-964, 2000, electrical resistivity tomography as described in Gambetta, M., Armadillo, E., Carmisciano, C., Stefanelli, P., Cochic, L. and Tontini, F. C., "Determining geophysical properties of a near surface cave through integrated microgravity vertical gradient and electrical resistivity tomography measurements", Journal of cave and karst studies, vol. 73, p. 11-15, 2011, Putiska, R., Nikilaj, M., Dostal, I., and Kusnirak, D., "Determination of cavities using electrical resistivity tomography", contributions to geophysics and geodesy, vol. 42, p. 201-211, 2012 and Metwaly, M. and Alfouzan, F, "Application of 2-D geoelectrical resistivity tomography for subsurface cavity detection in the eastern part of Saudi Arabia", Geoscience Frontiers, vol. 4, p. 469-476, 2013, seismic refraction and reflection as described in Pernod, P., Piwakowski, B., Delannoy, B. and Tricot, J. C., "Detection of shallow underground cavities by seismic methods: physical modelling approach", Acoustical Imaging, vol. 17, p. 705-713, 1989 and Fiore, V. Di., Angelino, A., Passaro, s. and Bonanno, A., "High resolution seismic reflection methods to detect near surface cavities: a case study in the Neapolitan area, Italy", Journal of cave and Karst studies, vol. 75, p. 51-59, 2011, and transient electromagnetic methods (TEM) as described in Xue, G., Song, J., Xian, Y., "Detecting shallow caverns in China using TEM", The leading edge, vol. 23, 2004. The strength of the GPR and gravity methods to detect subsurface cavities is mainly due to their ability and relative ease of detecting the contrast in physical properties between the surrounding soil or rock and the materials that fill these cavities.

The GPR and gravity methods are nondestructive geophysical techniques that measure differences in the physical properties of the subsurface materials, such as the dielectric permittivity for the GPR method and the density contrast for the gravity method. The success of the GPR and gravity methods depends on the different subsurface materials having different dielectric permittivities and bulk densities, which produce variations in the measured electromagnetic wave velocity (due to variations in matrix composition and water content) and gravity field.

The literature records many studies describing qualitative investigations of cavities via utilizing several geophysical tools. A few typical negative gravity anomalies related to shallow cavities in large caverns in Iraq was described in Colley, G. C., "the detection of caves by gravity measurements", Geophysical prospecting, vol. 11, p. 1-9, 1963. The main components of subsurface cavity complex systems could be detected with microgravity measurements was shown in Butler D. K., "Interval gravity-gradient determination concepts", Geophysics, vol. 49, p. 828-832, 1984. The initial physical geological models was developed by computing the second and third derivatives of the gravity potential. In addition, the microgravimetric and gravity gradient techniques are used as effective tools to the delineation and detection of shallow subsurface tunnels and cavities as described in Butler, D. K., "Microgravimetric and gravity gradient techniques for detection of subsurface cavities," Geophysics, vol. 49, p. 1084-1096, 1984.

Promising results from using GPR for detecting cavities in limestone in an area of archaeologically important karst topography were presented in Chamberlain, A. T., Sellers, W., Proctor, C. and Coard, R., "Cave detection in limestone using ground penetrating radar", Journal of archaeological science, vol. 27, p. 957-964, 2000. The GPR and microgravimetric methods as tools for detecting and characterizing shallow subsurface karstic features in terms of shape, size and depth were described in Beres, M., Luetscher, M., and Olivier, R., Integration of ground penetrating radar and microgravimetric methods to map sallow caves, Journal of applied geophysics, vol. 46, pp. 249-262, 2001. GPR to delineate near-surface fractures within Dammam Dome was described in Al-Shuhail, A. A., Hariri, M. M. and Makkawi, M. H., "Using ground penetrating radar to delineate fractures in the Rus Formation, Dammam Dome, Eastern Saudi Arabia", International geology review, vol. 46, p. 91-96, 2004.

A new idea using GPR and seismic data quantitatively for estimating water saturation and porosity in subsoil using a shared earth model is described in Ghose, R., and Slob, E. C., "Quantitative integration of seismic and GPR reflections to derive unique estimates for water saturation and porosity in subsoil", Geophysical research letters, vol. 33, 2006 incorporated herein by reference in its entirety. Local density variations caused by a near surface void results in negative anomalies detectable using microgravity techniques as described in Panisova, J., and Pasteka, R., "The use of microgravity technique in archaeology: A case study from the St. Nicolas church in Pukanec, Slovakia" contributions to geophysics and geodesy vol. 39, p. 237-254, 2009.

Vertical gradient microgravity and electrical resistivity tomography can be used to give high-resolution images of underground voids as described in Gambetta, M., Armadillo, E., Carmisciano, C., Stefanelli, P., Cochic, L. and Tontini, F. C., "Determining geophysical properties of a near surface cave through integrated microgravity vertical gradient and electrical resistivity tomography measurements", Journal of cave and karst studies, vol. 73, p. 11-15, 2011.

A new approach for modeling subsurface cavities characterized by typical geometries such as sphere, vertical and horizontal cylinder by using a linear neuro-fuzzy microgravity technique was described in Hajian, A., Zomorrodian, H., Styles, P., Greco, F. and Lucas, C., "Depth estimation of cavities from microgravity data using a new approach: the local linear model tree", near surface geophysics, vol. 10, p. 221-234, 2012 incorporated herein by reference in its entirety.

Shallow cavities in tuff layer characterized by a high acoustic impedance contrast can be easily detected with a high resolution P-wave seismic reflection technique as described in Fiore, V. Di., Angelino, A., Passaro, S. and Bonanno, A., "High resolution seismic reflection methods to detect near surface cavities: a case study in the Neapolitan area, Italy", Journal of cave and Karst studies, vol. 75, p. 51-59, 2011.

2D electrical resistivity survey was used in a newly urbanized area in Alhassa of Saudi Arabia to delineate different cavities as described in Metwaly, M and AlFouzan, F., Application of 2-D geoelectrical resistivity tomography for subsurface cavity detection in the eastern part of Saudi Arabia, Geoscience Frontiers, vol. 4, p. 469-476, 2013.

The presence of cavities features in the subsurface rock and their potential collapse pose an acute geohazard and constitute a risk to developed land. The delineation of subsurface cavities and the determination of porosity and water saturation parameters of cavity filling materials are important in many geotechnical applications. Drilling is a most common method of site investigation in an attempt to detect and characterize physical parameters of subsurface cavities such as porosity and water saturation but it is expensive. In order to overcome this issue, non-invasive and cost-effective geophysical methods can be used for cavity detection. Due to the importance of estimating porosity and water saturation to civil engineers in designing better structures, as recognized by the present inventor, a joint inversion approach of GPR and gravity data is presented for calculating these two parameters.

To date there have not been attempts to combine GPR and gravity petrophysical methods to estimate porosity and water saturation of cavity filling materials. Previous GPR and gravity studies have been applied as integration on subsurface cavity detection using a qualitative approach.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY OF THE INVENTION

A method for characterizing subsurface cavities is provided that comprises receiving, via a network, ground penetrating radar measurements, receiving, via the network, gravity measurements, calculating a porosity of cavity filling materials based on the ground penetrating radar measurements and the gravity measurements using a data inversion approach, calculating a water saturation of the cavity filling materials based on the ground penetrating radar measurements and the gravity measurements using the data inversion approach, and sending the porosity and the water saturation to an external device to provide geological characterizing of the subsurface cavities to host applications.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 27 is an exemplary block diagram of a server according to one example.

DETAILED DESCRIPTION

Figure 1:
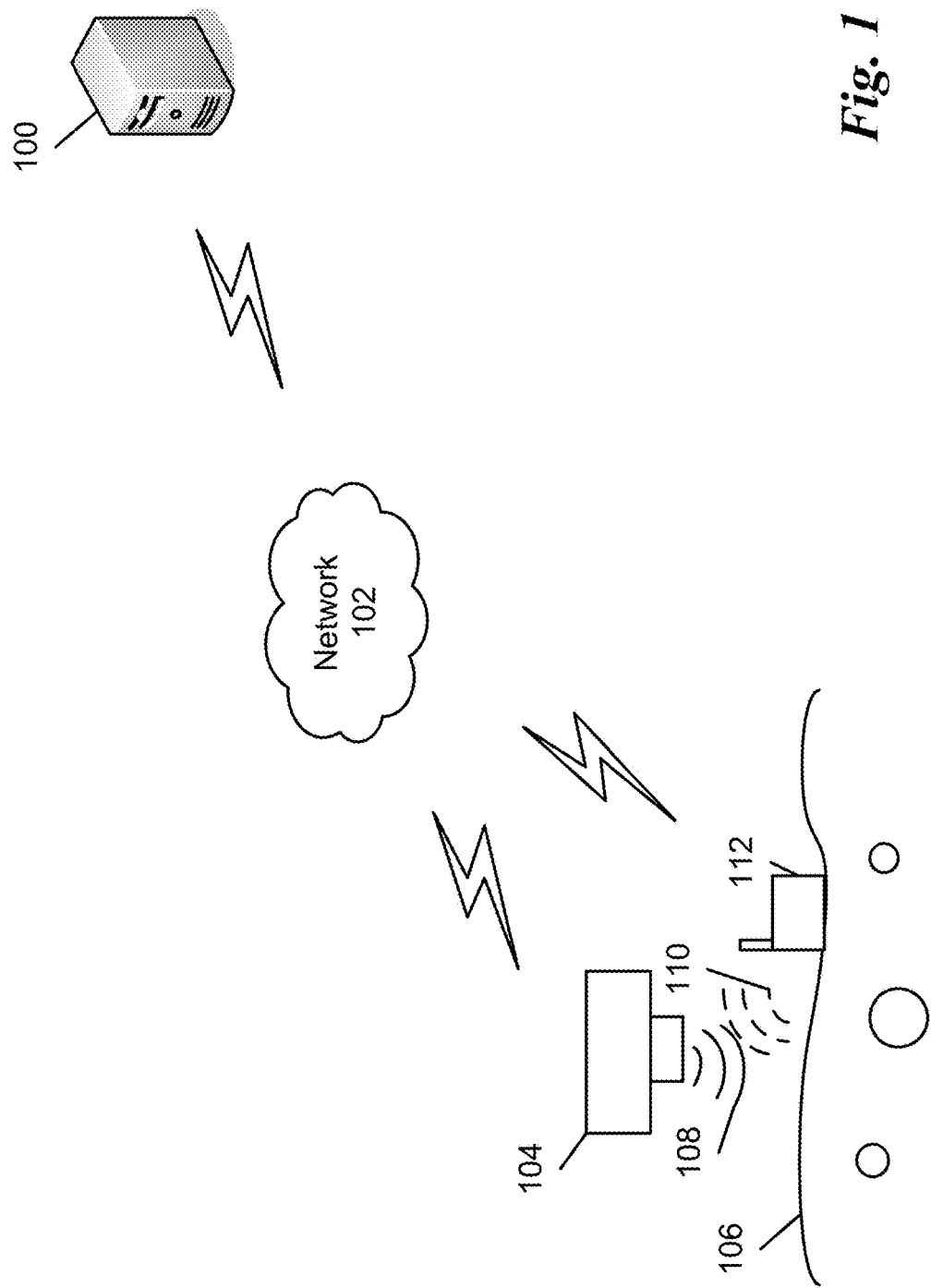
FIG. 1 is an exemplary schematic of a system for characterizing subsurface cavities according to one example.

Referring now to the drawings, wherein like reference numerals designate identical or corresponding parts throughout several views, the following description relates to a subsurface cavities system and associated methodology for characterizing subsurface cavities using gravity and ground penetrating radar data.

Detection of cavities is possible using geophysical methods because the presence of a cavity changes the physical properties of the subsurface rocks and causes a physical contrast between the cavity materials and the surrounding environment. Gravity methods measure a lateral variation in the vertical component of the gravitational field at the Earth's surface. The lateral variation in the vertical component of the gravitational field is due to the subsurface density distribution. Moreover, the gravity methods are appropriate to the investigation of subsurface geological features, such as tracing of geological boundaries and mapping of sedimentary basins. The cavities can be filled with air, water, sediments or a combination. Therefore, the cavities usually have a lower density than surrounding rocks, and produce a very small negative gravity anomaly.

Joint inversion of geophysical data is becoming a more reliable approach to minimize uncertainty in the inversion of geophysical data between the observed data and the assumed model. The geophysical data, for example, GPR and microgravity data, which are sensitive to same physical parameters, can be simultaneously inverted by optimizing objective functions that include the same physical parameters, such as porosity and water saturation.

FIG. 1 is an exemplary schematic of a system for characterizing subsurface cavities according to one example. FIG. 1 shows a ground penetrating radar (GPR) device 104 positioned above ground 106. The GPR device 104 may be moved along the ground 106. The GPR device 104 may be any device capable of transmitting an electromagnetic (EM) signal 108 and detecting a reflected signal 110 as would be understood by one of ordinary skill in the art. In selected embodiments, the GPR device 104 may transmit measurements via a network 102 to a server 100. The server 100 may also receive gravity data. The server 100 then may perform calculation to characterize the subsurface cavities. The network 102 is any network that allows the server 100 and the GPR device 104 to communicate information with each other such as, wide area network, local area network or the internet. In selected embodiments, the GPR device 104 may be equipped with a WiFi device or a Bluetooth device. In selected embodiments, the GPR device 104 may include radar electronics, antennas, a data digitizer, a computer, a display module, and other components as known to those of skill in the art. In one embodiment, the GPR device 104 method of operation may be that disclosed in U.S. Pat. No. 7,167,124 B2 entitled "DATA ACQUISITION FOR A GROUND PENETRATING RADAR SYSTEM", the entire disclosure of which is incorporated herein by reference.

The GPR device 104 may use multi frequencies. In one embodiment, the GPR device 104 uses electromagnetic radiation in the radiowave band (HF/VHF/UHF frequencies) of the radio spectrum, and receives the reflected GPR signal 110 from subsurface structures. The frequencies may be chosen according to the GPR application. The reflected GPR signal 110 depends on changes in the structure's physical properties. The GPR method can be used in different applications in a variety of media including rock, soil, ice, fresh water, pavements, and buildings. The GPR method may detect objects and changes in materials, such as surface voids, cavities, and utilities.

A microgravity survey device 112 measures a gravity profile. The microgravity survey device 112 may also include communication circuitry. The microgravity survey device may transmit the measured gravity profile to the server 100 via the network 102. In one embodiment, the microgravity survey device 112 may be that disclosed in U.S. Pat. No. 6,612,171 B1, entitled "GRAVITY MEASURING APPARATUS" the entire disclosure of which is incorporated herein by reference. In one embodiment, the GPR device 104 and the microgravity survey device 112 may be incorporated into a single device. The single device may include an input/output interface. The input/output interface may be used by an operator of the single device to enter a position of the single device. The position may be expressed as longitude and latitude coordinates. In other embodiments, the single device may also include location circuitry such as Global Positioning System (GPS) circuitry. The single device may send the position data with the measured gravity profile and the GPR measurement to the server 100. In selected embodiments, the server 100 may receive measurements from a plurality of GPR devices and a plurality of microgravity survey devices. In one embodiment, the single device may further include processing circuitry to perform the calculation to characterize the subsurface cavities when a connection to the network 102 is not available. The single device may also include a memory. The memory may be a USB flash drive. The flash drive is removable from the single device. The operator may then use a computer to view the calculated data.

Over the last ten years, microgravity surveying has developed considerably in several aspects. These improvements include the development of high-resolution instruments such as the Burris Gravity Meter as described in Mochales, T., Casas, A. M., Pueyo, E. L., Pueyo, O., Roman, M. T. Pocovi, A., Soriano, M. A. and Anson, D., "Detection of underground cavities by combining gravity, magnetic and ground penetrating radar surveys: a case study from the Zaragoza area, NE spain", Environ Geol, vol. 53, p. 1067-1077, 2008 incorporated herein by reference in its entirety, with a precision of 1 µGal (1 µGal=$10^{-6}$ cm/s$^2$), improved designs for field acquisitions, high-quality data correction methods and improved analysis procedures. As a result, it is possible to delineate and interpret anomalies as small as 10 µGal and this method also provides useful information about the depth, shape and geometry of cavities. In addition, there are laser levels with precisions greater than 1 mm such as the LEICA Sprinter, which the topographic elevation can be accurately measured.

Newton's Law of gravitation is the basic law that addresses gravity measurements and may be expressed by the following equation:

$$F_g = G\frac{M_1 M_2}{R^2} \quad (1)$$

where Fg is the gravitational force due to the two masses $M_1$ and $M_2$, G is the universal gravitational constant (6.672× $10^{-11}$ N·m$^2$/kg$^2$), $M_1$ and $M_2$ are the two masses and R is the distance between them.

From equation (1), gravitational acceleration (g) due to a body of mass M is:

$$g = \frac{GM}{R^2} \quad (2)$$

The gravitational acceleration, g, is measured in Gal (after Galileo), where 1 Gal=0.01 m/s$^2$. However, most targets of interest usually produce much smaller anomalies, especially in engineering and environmental studies. Consequently, these studies require surveys with µGal resolution (1 µGal=0.001 mGals). In this case, the term "Microgravity survey" is used instead of "Gravity Survey", which is generally used for regional gravity surveys. More information on the basics of the gravity method, are described in Nettleton, L. L., Gravity and Magnetics in oil prospecting, McGraw-Hill, 1976, and Telford, W. M., Geldart, L. P., and Sheriff, R. E., Applied geophysics, Cambridge, 1990 each incorporated herein by reference in its entirety.

Figure 2:
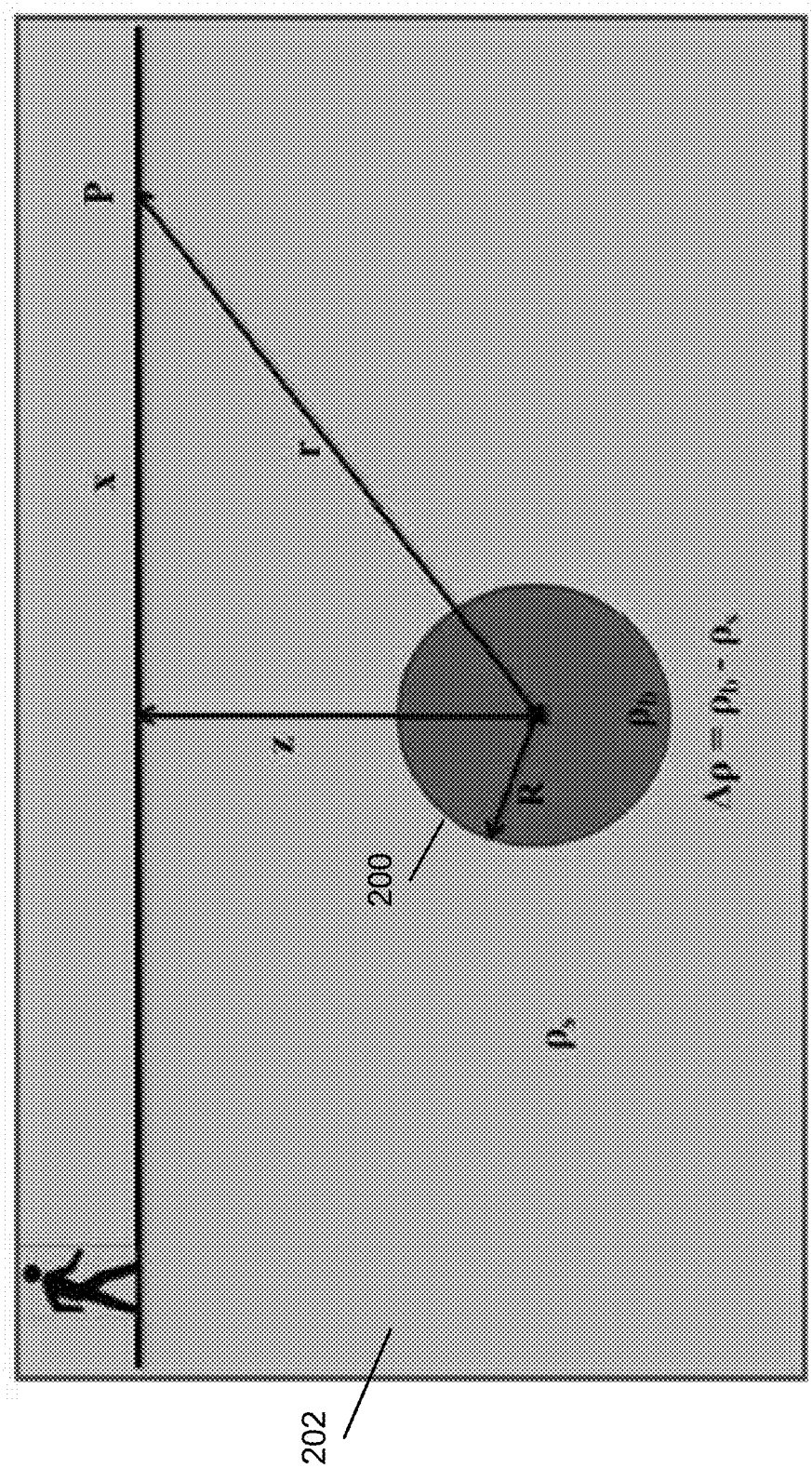
FIG. 2 is a schematic diagram that shows a spherical body and the parameters that affects its gravity anomaly according to one example.

FIG. 2 is a schematic diagram that shows a spherical body and the parameters that affects its gravity anomaly according to one example. FIG. 2 shows a sphere 200 that may represent a cavity in a rock 202. The cavities can be modeled as spherical bodies. The basic equation for the effect on gravity of a spherical body is given in equation (3) as described in Nettleton, L. L., Geophysical prospecting for oil, McGraw-Hill, 1940 incorporated herein by reference in its entirety.

These parameters are depicted in FIG. 2, where (R) is the radius of the sphere 200, (z) is the depth to the sphere's center, ($\Delta\rho$) is the density contrast between the sphere 200 and the rock 202, ($\rho_b$) is the density of the body and ($\rho_s$) is the density of the rock 202:

$$g_z = \frac{AGz}{(x^2+z^2)^{3/2}} \quad (3)$$

where A=4/3 $\pi R^3 \Delta\rho$.

The maximum gravity anomaly lies directly over the center of cavity where x=0 and equation (3) reduces to the following form:

$$g_{max} = \frac{AG}{z^2} \quad (4)$$

Figure 3:
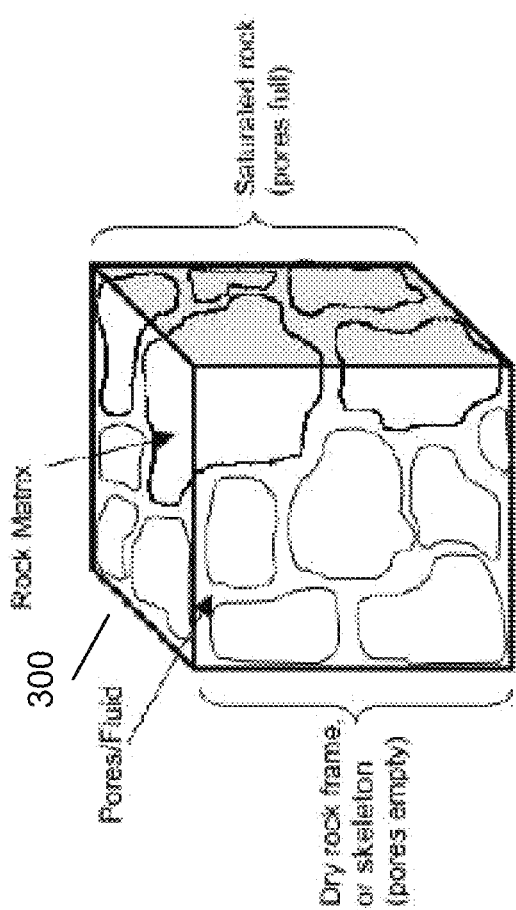
FIG. 3 is a schematic representation of a partially-saturated sedimentary rock with grains, air and water according to one example.

FIG. 3 is a schematic representation of a partially-saturated sedimentary rock with grains, air and water according to one example. FIG. 3 shows the partially-saturated sedimentary rock 300 with a plurality of pores. In the rock-physics model, the porosity-density relationship describes the bulk density of sedimentary rocks. Moreover, the phases used to describe sedimentary rocks are the rock grains and the pore voids, which may be filled with water and/or air as shown in FIG. 3.

The bulk density can be described as the sum of any number of components, weighted by their fractional volumes. One such variation is to allow fractional degrees of saturation, as shown in FIG. 3, and the porosity-density relationship (volume average equation) is given as $$\rho_b = \rho_g(1-\phi) + \rho_f \phi \quad (5)$$

where $$\rho_f = S_w \rho_w + (1-S_w)\rho_a \quad (6)$$

giving $$\rho_b = \rho_g(1-\phi) + S_w \rho_w \phi + \phi(1-S_w)\rho_a \quad (7)$$

GPR is a non-destructive method that generates EM pulses to record and locate the depth of buried objects or subsurface features that cannot be seen visually as explained in Do, J., Ground penetrating radar, Villanova University, Pennsylvania, p. 5, 2003. In the last three decades, the GPR technique has become an effective method for detecting shallow buried targets as described in Luo, Y. and G. Y. Fang "GPR clutter reduction and buried target detection by improved Kalman Filter Technique", Proceedings of 2005 international conference on machine learning and cybernetics, vol. 1-9, p. 5432-5436, 2005 incorporated herein by reference in its entirety.

GPR method is based upon the propagation and reflection characteristics of an EM wave through a material. The EM wave is reflected off the targets due to a change in the EM properties of subsurface objects, such as the dielectric permittivity ($\epsilon$), the magnetic permeability ($\mu$) and electrical conductivity ($\sigma$) as described in Daniels, D. J., Ground Penetrating radar, 2$^{nd}$ ed, London, Institution of Electrical Engineers, p. 729, 2004 and Scheele, M., Techniques for clutter reduction for GPR images, in Department of Electronic and Computer Engineering, University of Portsmouth, Portsmouth, p. 41, 2011.

An interface is an abrupt change in the electrical or magnetic material properties. Reflection and refraction result when a propagating EM wave encounters an interface that extends over large distances, compared to the wavelength and the reflected part of the wave is recorded in terms of its two-way travel time and amplitude for analysis and interpretation stages according to the objectives as described in Dojack, L., Ground Penetrating Radar Theory, Data collection, processing and interpretation: A guide for archaeologists, M. A. and S. Daniel, Editors. University of British Columbia, Vancouver, p. 94, 2012. The velocity of electromagnetic waves in subsurface materials may be expressed as:

$$\vartheta = \frac{c}{\sqrt{\varepsilon_b \mu_r \frac{1+\sqrt{1+\left(\frac{\sigma}{\omega \varepsilon_b}\right)^2}}{2}}} \quad (8)$$

where $\omega=2\pi f$ is the angular frequency, c is the EM wave velocity in vacuum (0.3 m/ns), $\varepsilon_b$ denotes the dimensionless bulk relative dielectric permittivity, $\mu_r$ is the dimensionless relative magnetic permeability, $\sigma$ is the electrical conductivity of the medium in units of (Siemens/m), and $\sigma/\omega \varepsilon_b$ is the loss factor. However, in materials with no conductivity ($\sigma=0$) and no magnetic properties ($\mu_r=1$), equation (8) as derived in Davis, J. L., and Annan, A. P., Ground penetrating radar for high resolution mapping of soil and rock stratigraphy, Geophysical prospecting, 37, 531-551, 1989 incorporated herein by reference in its entirety can be expressed as:

$$\vartheta = \frac{c}{\sqrt{\varepsilon_b}} \quad (9)$$

Resolution is defined as the ability to distinguish two closely spaced reflections. It is mainly controlled by the EM wavelength. However, it can also be affected by other factors such as polarization of the EM energy, the reflection coefficient, geometrical aspects of the target, and noise. In addition, the rate of spatial change in properties between the target and the host medium plays an important role in determining resolution. Generally, resolution increases as the change becomes sharper and decreases as the change becomes gradational as described in Olhoeft, G. R., Maximizing the information return from ground penetrating radar, J. Applied Geophysics, v. 43, no. 2-4, p. 175-187, 2000 incorporated herein by reference in its entirety. Furthermore, there is a trade-off between resolution and penetration depth. The resolution increases with frequency, while penetration depth decreases with frequency as described in Conyers, L. B., Ground-penetrating radar for archaeology, walnut creek, Calif. Oxford, AltaMira Press, 2004 and Grealy, M., Resolution of Ground-Penetrating radar reflections at differing frequencies, Archaeological prospection, vol. 13, p. 142-146, 2006 each incorporated herein by reference in its entirety. For more information on the principles of GPR, see in Davis, J. L., and Annan, A. P., Ground penetrating radar for high resolution mapping of soil and rock stratigraphy, Geophysical prospecting, 37, 531-551, 1989 incorporated herein by reference in its entirety.

The electrical properties of porous rocks are sensitive to the volume fractions of the solid and fluid phases. Additionally, the most important factors in determining the dielectric constant of near-surface materials are the porosity and water saturation. The complex refractive index model (CRIM) is a widely used formula for expressing the bulk dielectric permittivity of a material as a function of its porosity and water saturation. The CRIM is based on a volumetric averaging of the dielectric constants of the constituents of composite materials as described in Tsui, F, and Matthews, S. L., "Analytical modelling of the dielectric properties of concrete for subsurface radar applications", Construction and Building Materials, vol. 11, no. 3, pp. 149-161, 1997 incorporated herein by reference in its entirety:

$$\sqrt{\varepsilon_b} = \phi(1-S_w)\sqrt{\varepsilon_a} + (1-\phi)\sqrt{\varepsilon_g} + \phi S_w \sqrt{\varepsilon_\omega} \quad (10)$$

The new joint inversion approach combines gravity and GPR data in a petrophysical approach using appropriate rock-physics models of the porosity-density relationship and the CRIM.

A gravity and GPR joint inversion requires a link between the two techniques. Therefore, porosity and water saturation were established as the crucial link between dielectric permittivity and density through the porosity-density relationship equation (7) and CRIM equation (10). Thus, these petrophysical properties provide a useful link in the joint inversion approach to determine the porosity and water saturation from GPR and gravity data sets.

A data inversion approach, in which multiple geophysical data sets are analyzed and inverted simultaneously, represents an expanding field in geophysics. As a result, uncertainty in interpretations will be reduced. In this disclosure, the data inversion approach for gravity and GPR data sets has been developed.

The gravity and GPR methods are used because they are popular techniques in cavity investigations and in near-surface geophysics applications. In addition, the theory of these techniques is relatively simple, which helps us to develop a new joint inversion approach to determine porosity and water saturation from other geophysical methods.

Figure 4:
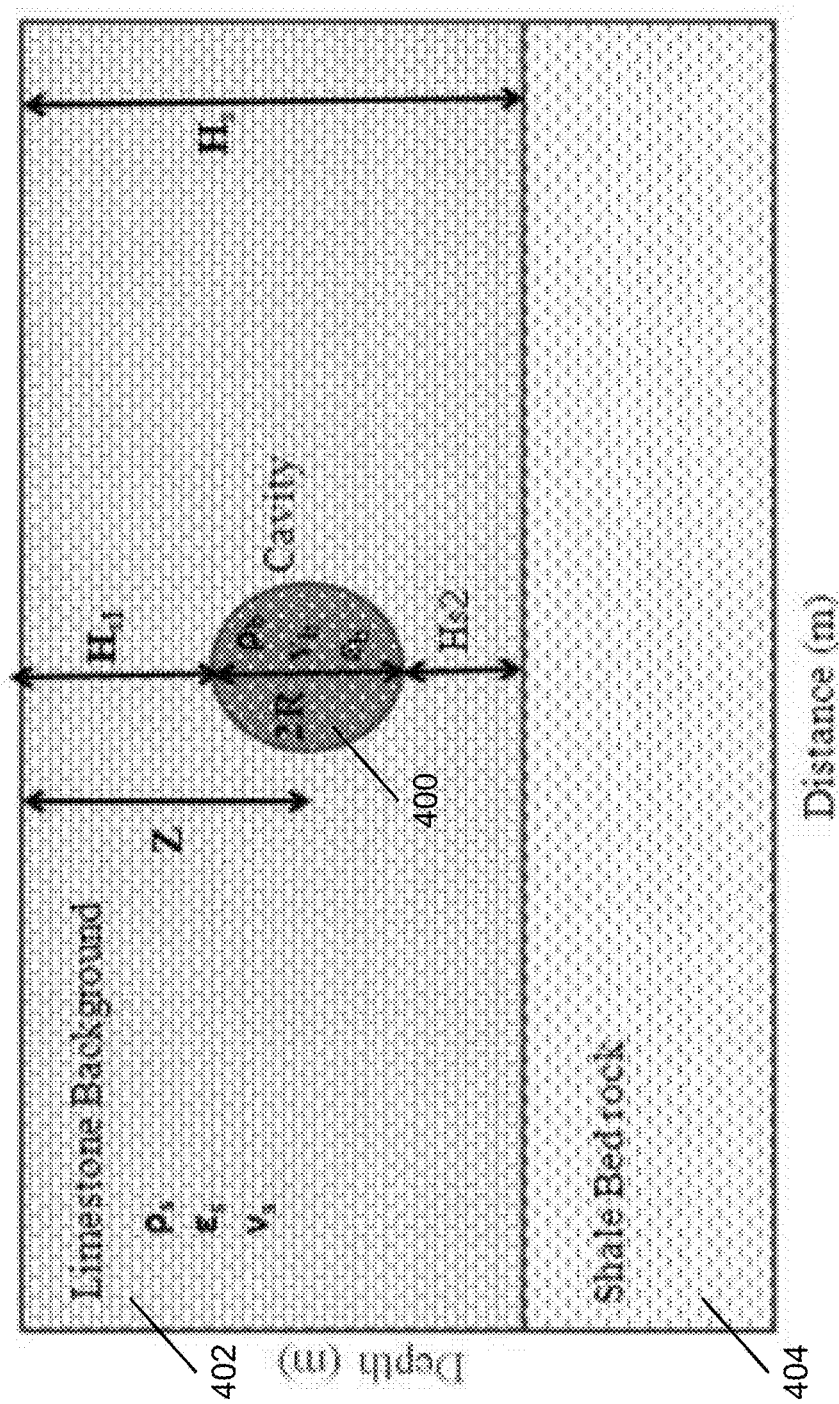
FIG. 4 is a schematic that shows different parameters used in GPR according to one example.

FIG. 4 is a schematic that shows different parameters used in GPR according to one example. FIG. 4 shows a spherical cavity 400 in a limestone background 402 over a shale bed rock 404. The spherical cavity 400 may be filled with sediments, air, water or a combination of two or more phases.

Now, according to basic model shown in FIG. 4, the following relationships may be written that are important to formulate the general equations, which are solved later with respect to porosity and water saturation.

$$H_{s1} = z - R \quad (11)$$

$$H_{s2} = H_s - (z + R) \quad (12)$$

$$H_b = 2R \quad (13)$$

$$R = z - H_{s1} \quad (14)$$

$$T_0 = \frac{2H_s}{V_s} \quad (15)$$

$$H_s = \frac{T_o V_s}{2} \quad (16)$$

-continued $$V_b = \frac{0.3}{\sqrt{\varepsilon_b}} \quad (17)$$

$$T_c = T_{s1} + T_b + T_{s2} \quad (18)$$

then $$T_c = \frac{2H_{s1}}{V_s} + \frac{2H_b}{V_b} + \frac{2H_{s2}}{V_s} \quad (19)$$

In this approach, the GPR travel times are used directly, without the need to create a velocity tomogram. This is one of the benefits of this approach. Subsequently, it is easy to invert equation (19) with respect to $V_b$ and obtain the following equation $$V_b = \frac{4RV_s}{V_s T_c - 2H_s + 4R} \quad (20)$$

Figure 5:
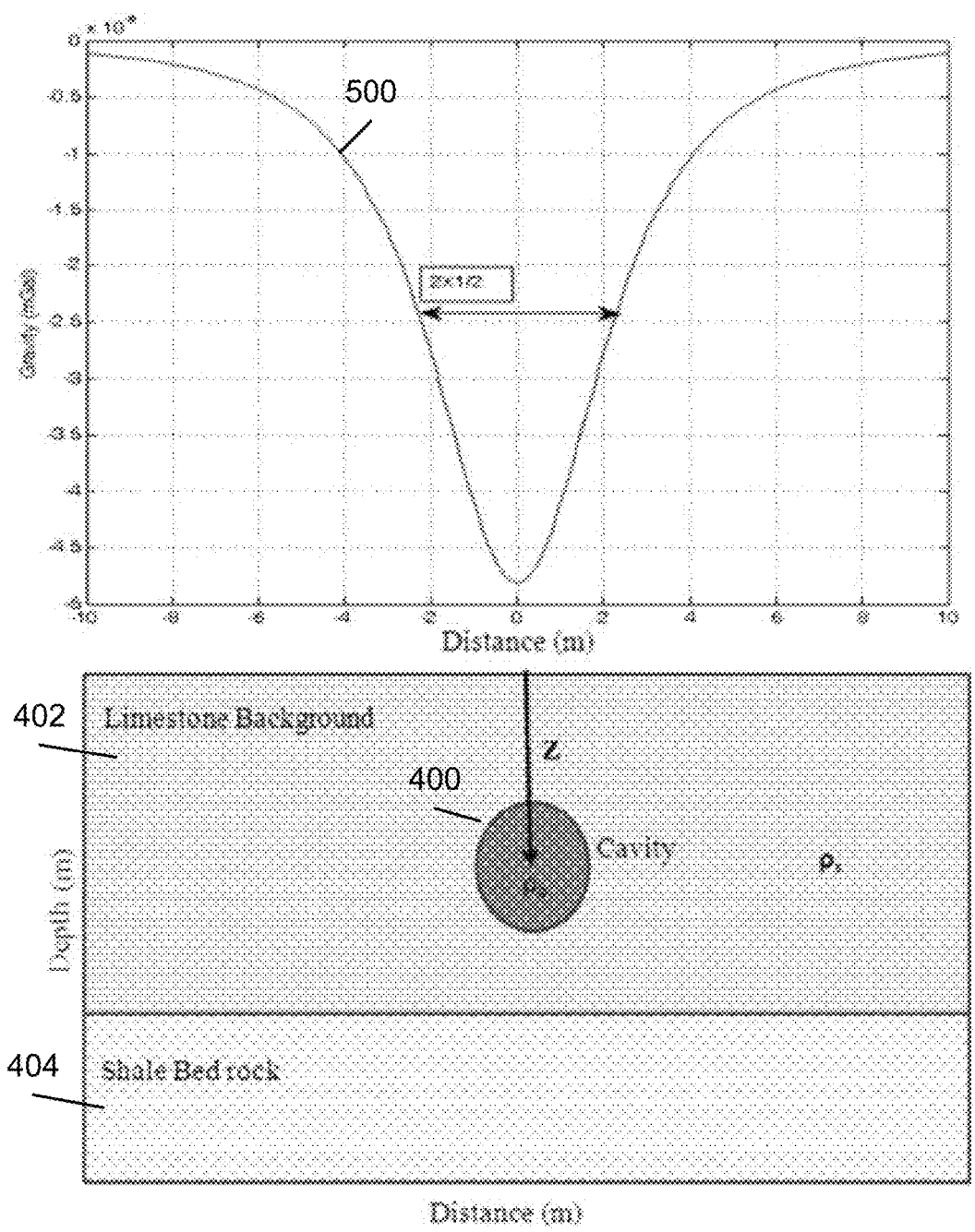
FIG. 5 is a schematic that shows a spherical cavity model within a limestone bed and the corresponding gravity anomaly curve over cavity according to one example.

FIG. 5 is a schematic that shows a spherical cavity model within a limestone bed and the corresponding gravity anomaly curve over the spherical cavity according to one example. FIG. 5 shows the spherical cavity 400 in the limestone background 402 over the shale bed rock 404 with the corresponding gravity profile 500.

Substituting equation (20) into equation (9), the following general equation of dielectric permittivity of cavity-filling materials is obtained, where $x_{1/2}$ is the half-width of the anomaly curve at half of the maximum gravity anomaly value shown in FIG. 5:

$$\sqrt{\varepsilon_b} = \frac{0.3[V_s T_c - 2H_s + 4(1.305x_{1/2} - H_{s1})]}{4V_s(1.305x_{1/2} - H_{s1})} \quad (21)$$

Finally, by substituting equation (21) into equation (10), the general equation deduced from the GPR data for a spherical cavity can be written as:

$$\frac{0.3[V_s T_c - 2H_s + 4(1.305x_{1/2} - H_{s1})]}{4V_s(1.305x_{1/2})} = \quad (22)$$

$$\phi(1 - S_w)\sqrt{\varepsilon_a} + (1 - \phi)\sqrt{\varepsilon_g} + \phi S_w \sqrt{\varepsilon_w}$$

In the same manner, the effects of cavity-filling materials on gravity are expressed in a general equation that can be derived from a gravity profile, as illustrated in FIG. 5. Now, the relationships below can be written based on a spherical cavity model shown in FIG. 5. The bulk density of the cavity materials is expressed as:

$$\rho_b = \rho_s + \Delta\rho \quad (23)$$

As discussed earlier, the maximum gravity anomaly lies directly over the center of the spherical cavity, where x=0. To identify the bulk density of the cavity material, equation (4) is rewritten with respect to $\Delta\rho$ as follows:

$$\Delta\rho = \frac{3Z^2 g_{max}}{4\pi GR^3} \quad (24)$$

Substituting equation (24) into equation (23), the following general equation of the bulk density of cavity materials is obtained:

$$\rho_b = \frac{3Z^2 g_{max}}{4\pi GR^3} + \rho_s \quad (25)$$

From the rule of the half-width method described in Nettleton, L. L., Gravity and magnetic calculations, Geophysics, vol. 7, p. 293-310, 1942 incorporated herein by reference in its entirety, the depth to the center of the spherical cavity can be estimated by using this empirical formula: $z=1.305 \times x_{1/2}$, where $x_{1/2}$ is the width of the anomaly curve at half of the maximum gravity anomaly (shown in FIG. 5). Moreover, the radius of the cavity can be estimate from GPR data, discussed previously as $R=z-H_{s1}$. Hence, equation (25) may be expressed as $$\rho_b = \frac{3(1.305x_{1/2})^2 g_{max}}{4\pi G(1.305x_{1/2} - H_{s1})^3} + \rho_s \quad (26)$$

Finally, by substituting the value of $\rho_b$ from equation (26) into the density-porosity relationship given by equation (7), the general equation deduced from the gravity data can be written as:

$$\frac{1.27(x_{1/2})^2 g_{max}}{\pi G(1.30x_{1/2} - H_{s1})^3} + \rho_s = \rho_g(1 - \phi) + S_w \rho_w \phi + \phi(1 - S_w)\rho_a \quad (27)$$

All the parameters in equations (22) and (27) are known except $S_w$ and $\phi$. As an illustration, the depth to the center of cavity z and $x_{1/2}$ can be obtained from the gravity curve, while the H, $H_{s1}$ and $H_{s2}$ can be calculated from travel time picking on the radargram. Moreover, there are many constants, such $\rho_g$, $\rho_w$, $\rho_a$, $\varepsilon_g$, $\varepsilon_w$, $\varepsilon_a$ and G, that are tabulated in most geophysical references such as Telford, W. M., Geldart, L. P., and Sheriff, R. E., Applied geophysics, Cambridge University Press, Cambridge, 1990. Because all other parameters in equations (22) and (27) are known, these two equations can be solved simultaneously for $\phi$ and $S_w$, to give the following solutions:

$$\phi = \frac{CM - AD}{CN - BD} \quad (28)$$

$$S_w = \frac{-BM + AN}{CN - BD} \quad (29)$$

where $$A = \frac{1.27(x_{1/2})^2 g_{max}}{\pi G(1.305x_{1/2} - H_{s1})^3} + \rho_s - \rho_g, \quad B = \rho_a - \rho_g,$$

$$C = \rho_w - \rho_a, \quad D = \sqrt{\varepsilon_w} - \sqrt{\varepsilon_a},$$

$$M = \frac{0.3[V_s T_c - 2H_s + 4(1.305x_{1/2} - H_{s1})]}{4V_s(1.305x_{1/2} - H_{s1})} - \sqrt{\varepsilon_g} \text{ and}$$

$$N = \sqrt{\varepsilon_a} - \sqrt{\varepsilon_g}.$$

Figure 6:
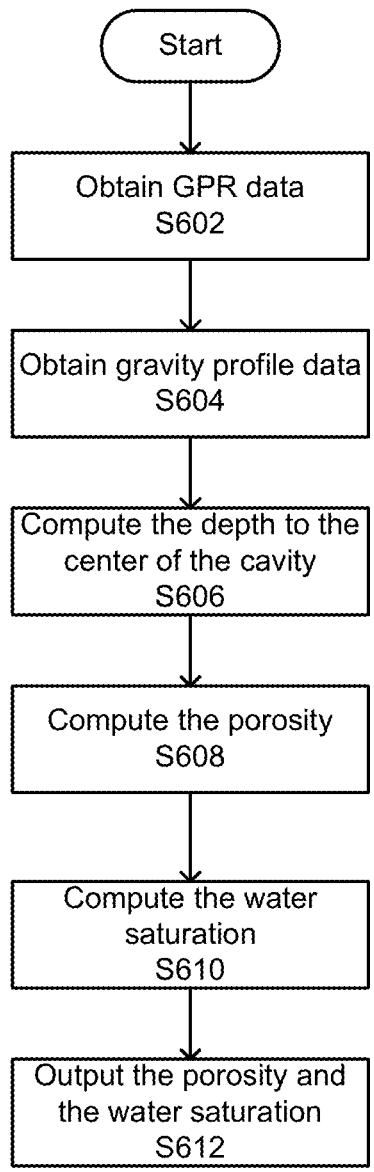
FIG. 6 is an exemplary flow chart illustrating a method to characterize subsurface cavities according to one example.

FIG. 6 is an exemplary flow chart illustrating a method to characterize subsurface cavities according to one example. At step S602, the server 100 may obtain the GPR data from the GPR device 104 via the network 102. At step S604, the server may obtain the gravity profile data from the microgravity survey device 112. At step S606, the server 100 using processing circuitry compute the depth to the center of the cavity based on, at least, the gravity profile data obtained at step S604. At step S608, the server 100 may compute the porosity of the material in the cavity based on the GPR and gravity profile data obtained at steps S602 and S604. In one embodiment, the server may use equation (28) to compute the porosity. At step S610, the server 100 may compute the water saturation of the material in the cavity in function of the GPR and gravity profile data obtained at step S602 and S604. In one embodiment, the server may use equation (29) to compute the water saturation. At step S612, the server 100 output the calculated porosity and water saturation to a user.

The user may analyze the calculated porosity and the water saturation to determine the type of the material in the cavity. For example, the user may determine a fluid type such as gas, oil, water, bitumen or the like. In addition, the user may obtain hydrocarbon saturation from the water saturation. The user may also combine the calculated data with other studies such as geological and geophysical studies and reservoir engineering to fully characterize a reservoir. In addition, based on the calculated porosity and the water saturation, the method may further include the step of drilling. The system and associated methodology of the present disclosure may be used for reservoir monitoring to assess the changes in water saturation over time. In selected embodiments, the server 100 may be further configured to compute estimates of the reservoir size and the petroleum hydrocarbons. In selected embodiments, the method may further include steps to predict the permittivity of a survey area. The steps may include a forward modeling technique such as phenomenological mixing model. The system may also include the step of obtaining a stereoscopic image of the cavity to determine the shape of the cavity.

Figure 7:
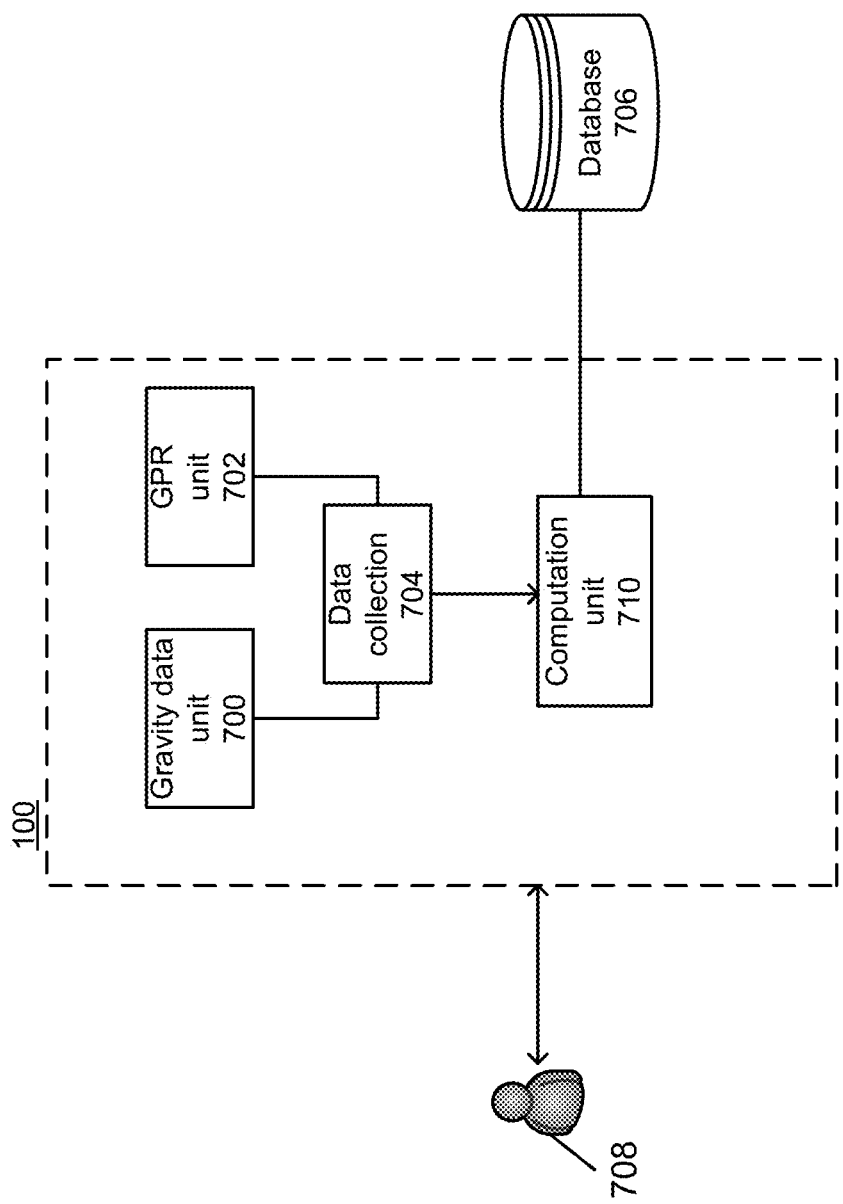
FIG. 7 is an exemplary block diagram illustrating a system to characterize subsurface cavities according to one example.

FIG. 7 is an exemplary block diagram illustrating the system to characterize subsurface cavities according to one example. The server 100 may include a gravity data unit 700, a GPR unit 702, a data collection unit and a computation unit 710. The system may include a database 706. The gravity data unit 700 may receive gravity data from one or more microgravity surveying device 112. The GPR unit 702 may collect data from one or more GPR device 104. The data collection unit 704 may store the gravity and GPR data. The data collection unit 704 may also further process the gravity and GPR to eliminate noise from data or possible erroneous readings. Physical constants may be stored in the database 706. A user 708 may indicate through a user interface a type of soil then the server 100 may retrieve from the database 706 the appropriate physical constants to be used by the computation unit 710. The user interface is provided with input devices such as a mouse, a tablet, a keyboard and so on, through which users input commands and data and output devices such as a display and so on, through which the system provides the users with the calculated data. The computation unit may use equation (28) and equation (29) to compute the porosity and the water saturation. The server 100 may then output the calculated porosity and water saturation to the user 708. The server 100 may send the porosity and water saturation data to an external device to provide geological data to host applications such as oil exploration.

To illustrate the capabilities of the characterization system, exemplary results are presented. Synthetic gravity and GPR data sets are used to estimate the porosity and water saturation of cavity materials.

Figure 8A:
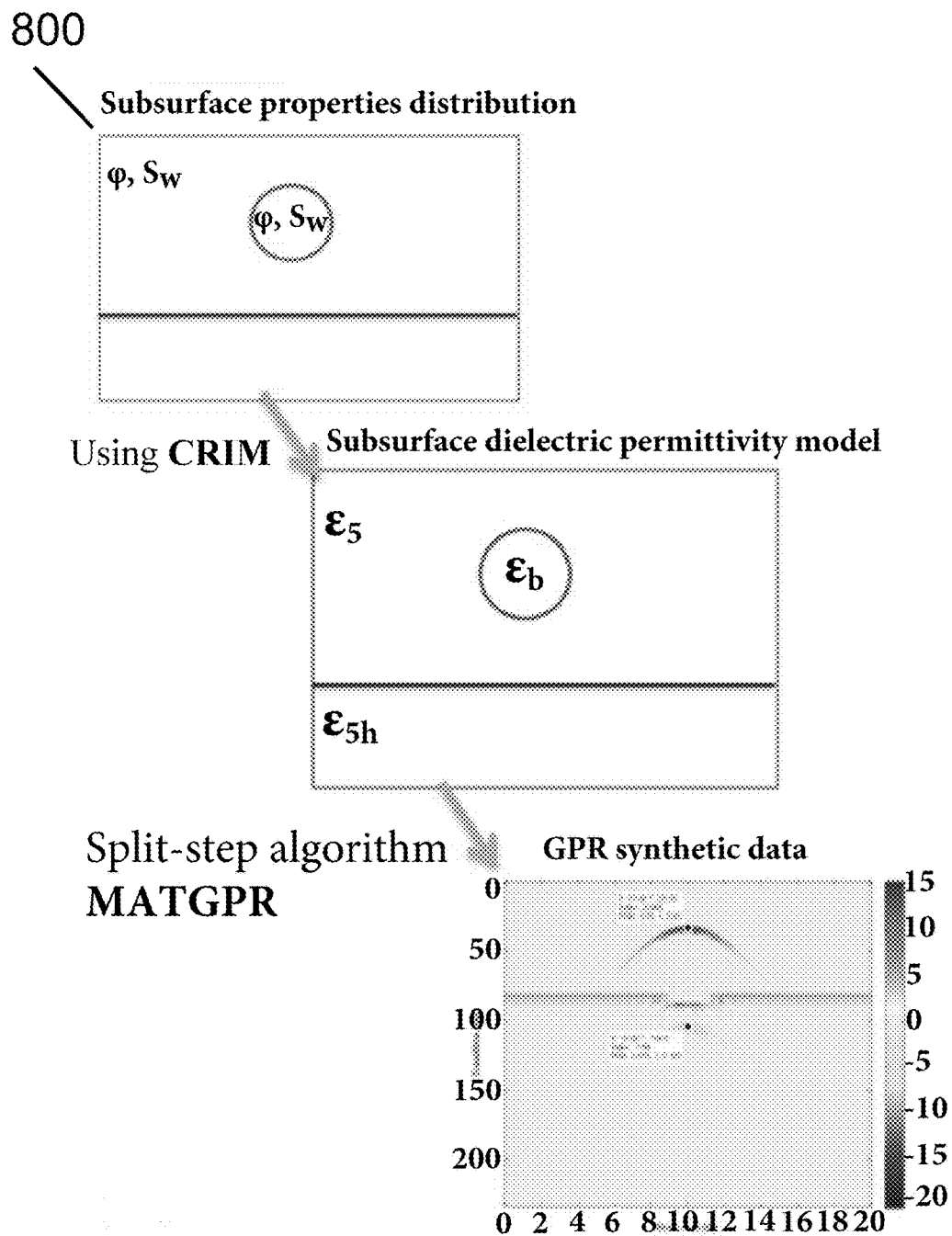
FIG. 8A is a schematic illustration of a forward modeling procedure to generate synthetic GPR.
Figure 8B:
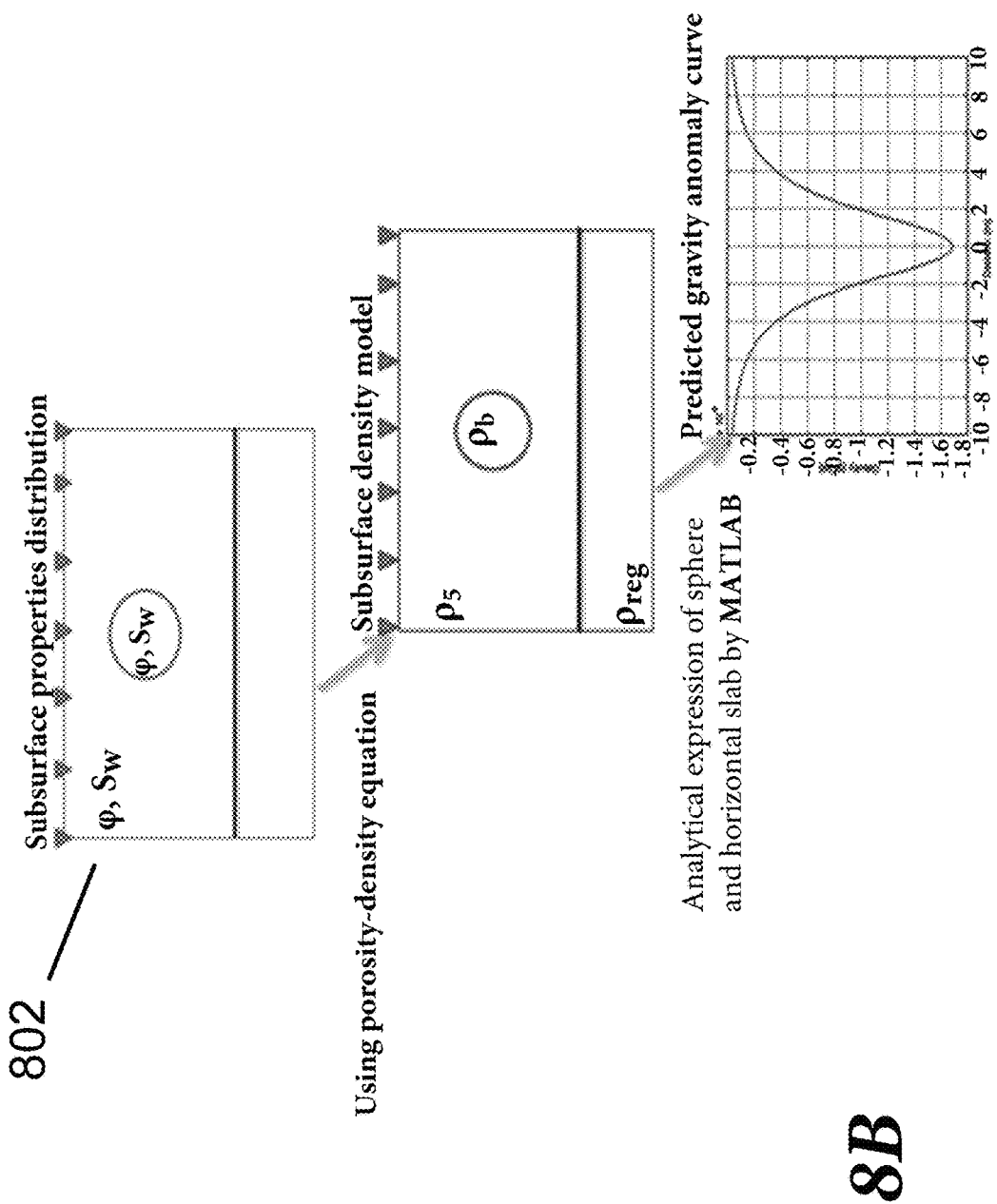
FIG. 8B is a schematic illustration of a forward modeling procedure to generate predicted anomaly gravity data according to one example.

FIG. 8 is a schematic illustration of a forward modeling procedure to generate synthetic GPR and gravity data according to one example. The synthetic GPR and gravity data are used to validate the system for estimating the porosity and water saturation of cavity materials. The procedure followed to generate GPR and gravity synthetic data through forward modelling is illustrated in FIG. 8. For a given subsurface model that reflects the distribution of target parameters (porosity and water saturation), the given subsurface model can be converted to subsurface dielectric model using a suitable rock physics model (CRIM). Then, the GPR synthetic data is produced using a forward modeling split-step algorithm as illustrated by 800. On the other hand, in the case of gravity, the subsurface properties distribution is converted to subsurface densities model through porosity-density relationship. Then, the predicted gravity anomaly curve is calculated through analytical expression of sphere and horizontal slab as depicted in 802.

GPR synthetic data may be computed using a two-dimensional split-step algorithm as described in Bitri, A. and Grandjean, G., Frequency wavenumber modelling and migration of 2D GPR data in moderately heterogeneous dispersive media, Geophysical prospecting, vol. 46, p. 287-301 (1998) incorporated herein by reference in its entirety. The two-dimensional split-step algorithm is a full-waveform method that requires the solution of Maxwell's equations in the frequency domain, and it is implemented via MATGPR described in Tzanis, A., matGPR Release 2: A freeware MATLAB package for the analysis and interpretation of common and single offset GPR data, FastTimes, Vol. 15, p. 17-43, 2010 incorporated herein by reference in its entirety, which is an EM wave simulator for GPR modeling based on the split-step numerical method.

Figure 9:
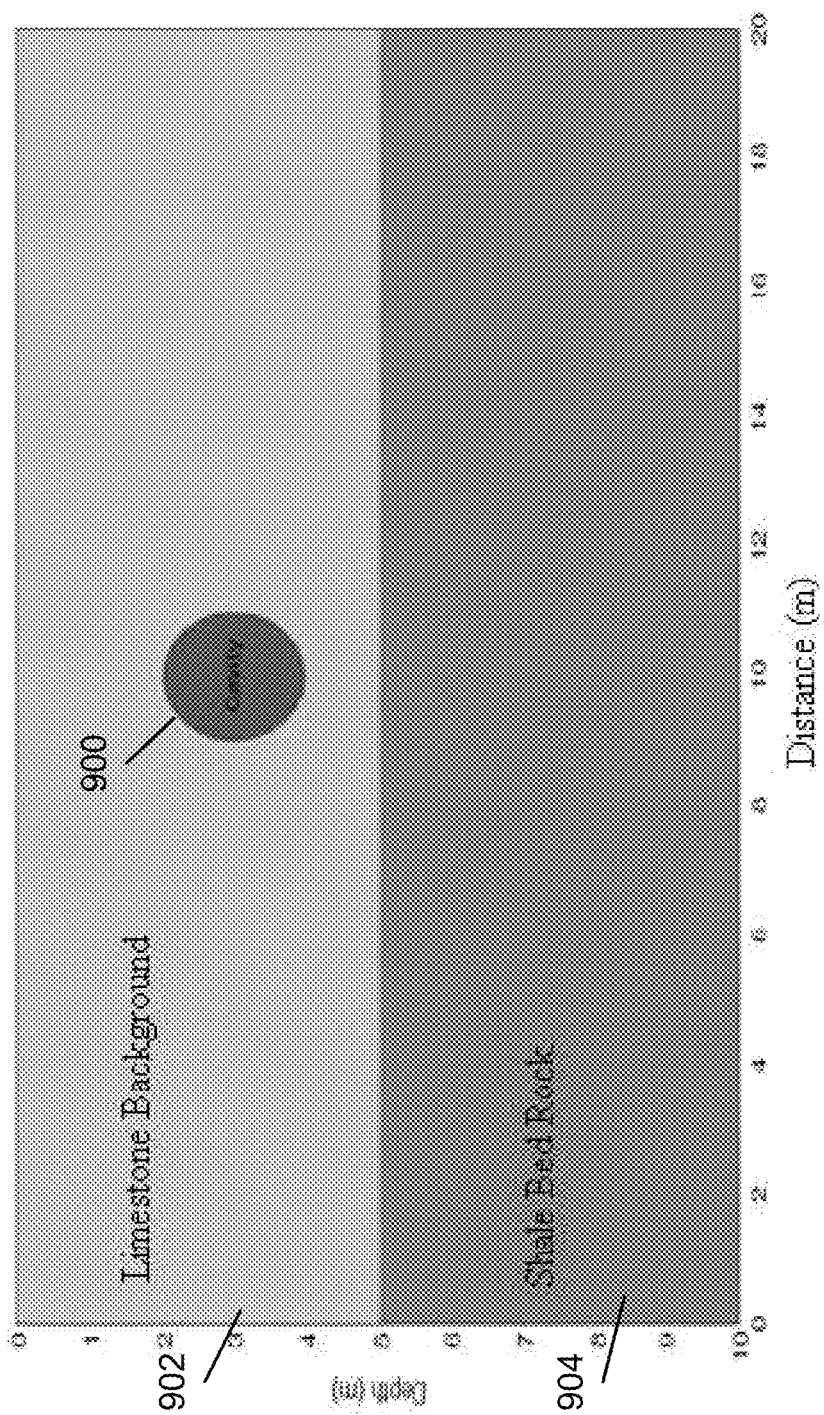
FIG. 9 is a schematic illustration of basic model elements used in the generation of synthetic GPR and gravity data according to one example.

FIG. 9 is a schematic illustration of a basic model used in the generation of synthetic GPR and gravity data according to one example. The basic model shown in FIG. 9 has horizontal and vertical dimensions of 20 m and 10 m, respectively, and a grid spacing of 1 m in both directions. Additionally, there is a horizontal interface at 5 m, which separates an upper limestone layer 902 and a lower shale bedrock 904. Also shown in FIG. 9 is a spherical cavity 900 in the upper layer with a radius of 1 m, and its center is located at a depth of 3 m and a horizontal distance of 10 m. For each model described below, the sediment grains dielectric permittivity was assigned a value of $\epsilon_g$=4.5 (assuming pure quartz sand grains), the water permittivity was $\epsilon_w$=80 and $\epsilon_a$=1 for air dielectric permittivity, the center frequency of the EM wave used in all GPR simulations is 250 MHz. The permittivities may be stored in the database 706.

Figure 10:
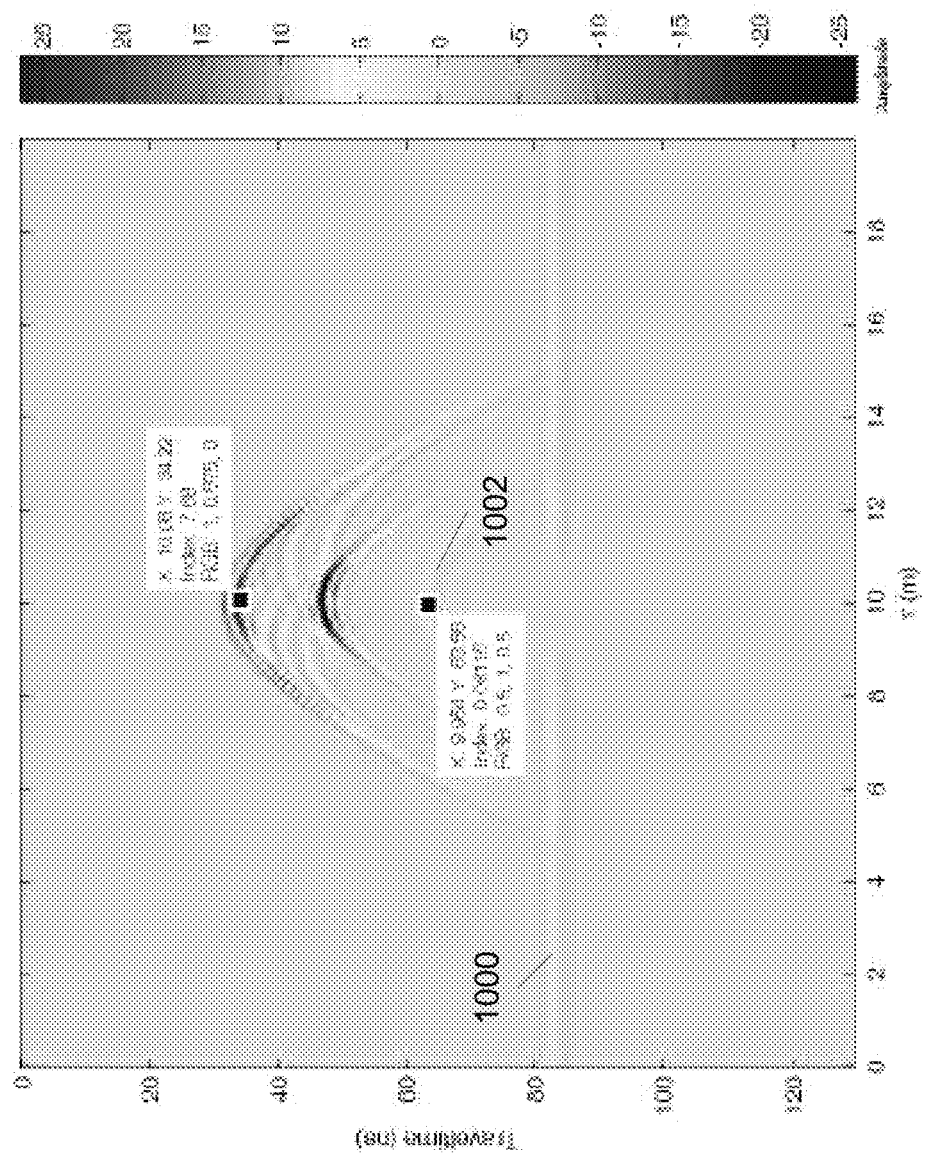
FIG. 10 is a synthetic radargram for a cavity filled with pure air according to one example.

FIG. 10 is a synthetic diagram radargram for a cavity filled with pure air according to one example. In this model, according to the CRIM, the dielectric permittivity of the cavity material is $\epsilon_b$=1 and it has a high resistivity, producing an EM wave velocity through the cavity materials of 0.2998 m/ns. The limestone background has a dielectric permittivity of 6.25. The synthetic radargram of this model is shown in FIG. 10. The two synthetic layers and the positions of the top and bottom of the cavity are clearly shown. However, the variation between the different dielectric permittivities of each layer changes the two-way travel times, and it is controlled by the EM wave velocity through the various materials. In general, there is a horizontal event at 83.34 ns indicated by 1000, which represents the horizontal interface between the upper limestone layer 902 and the lower shale layer 904 at 5 m depth. In addition, there are two hyperbolas, which represent the top and bottom of the cavity. The most important event is the travel time to the interface directly beneath the cavity, which appears as a hyperbola 1002 at 63.56 ns.

Figure 11:
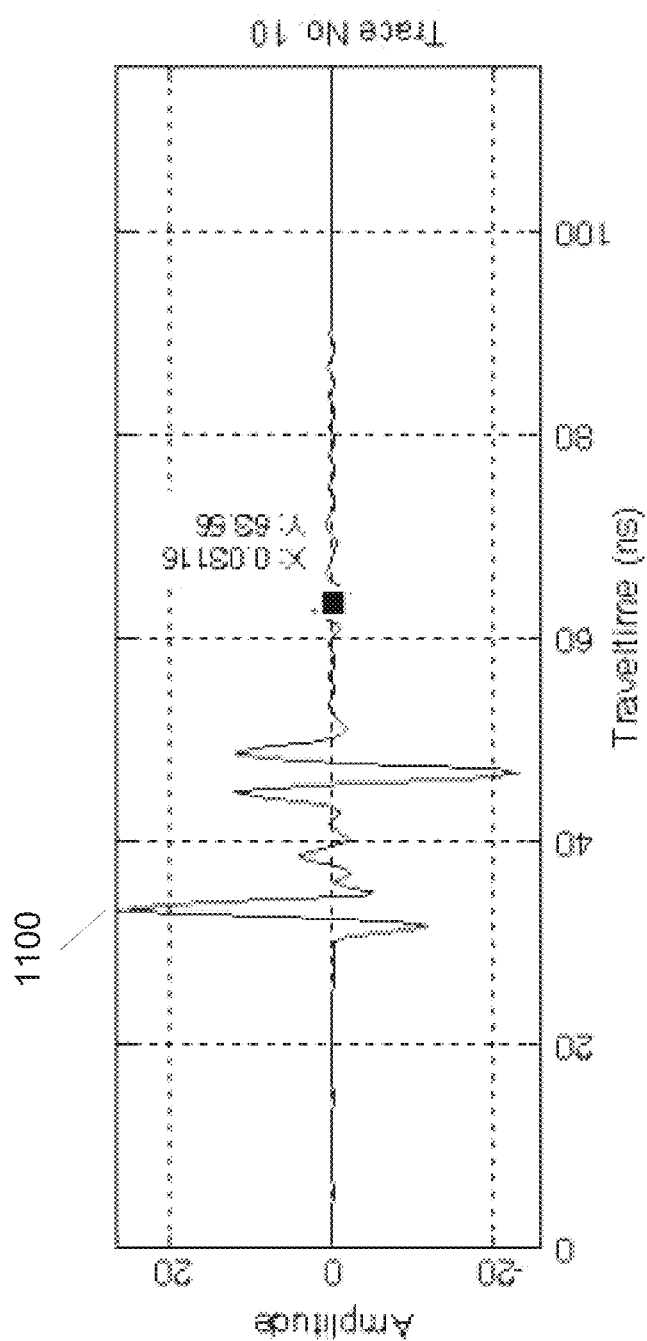
FIG. 11 is a trace showing GPR data through a cavity according to one example.

FIG. 11 is a trace showing GPR data through a cavity according to one example. The trace 1100 is extracted from FIG. 10. The trace 1100 represents the GPR data at x=10 m and shows the events described above.

Figure 12:
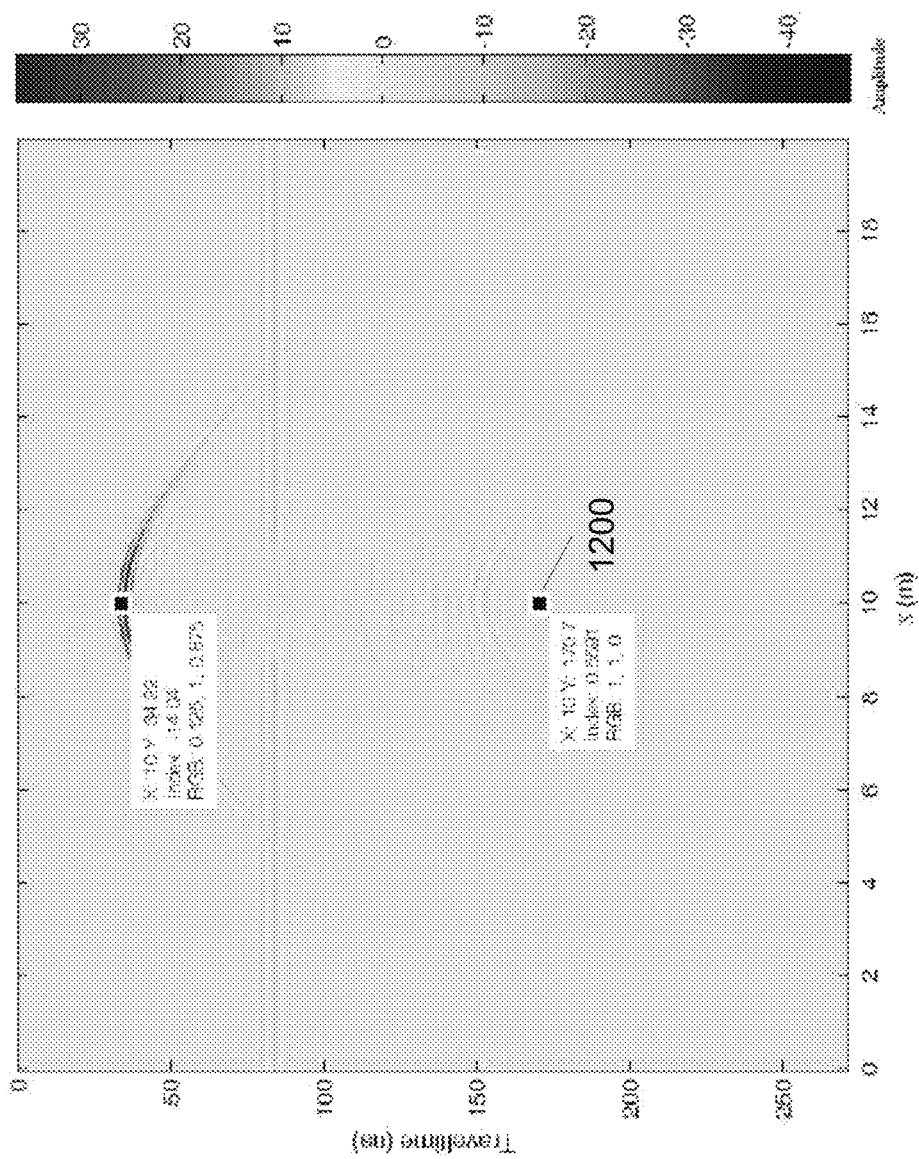
FIG. 12 is a synthetic radargram for a cavity filled with pure water according to one example.

FIG. 12 is a synthetic radargram for a cavity filled with pure water according to one example. In this model, the dielectric permittivity $\epsilon_b$=80, and the EM wave velocity through the cavity materials is equal to 0.033518 m/ns. The position of the top and the bottom of the cave in this figure is correctly detected. The travel time at the interface directly beneath the cavity is 170.7 ns indicated by 1200. In this case, the reflection is weak due to the presence of water in the cavity, which attenuates the EM waves and decreases the velocity of the EM waves.

Figure 13:
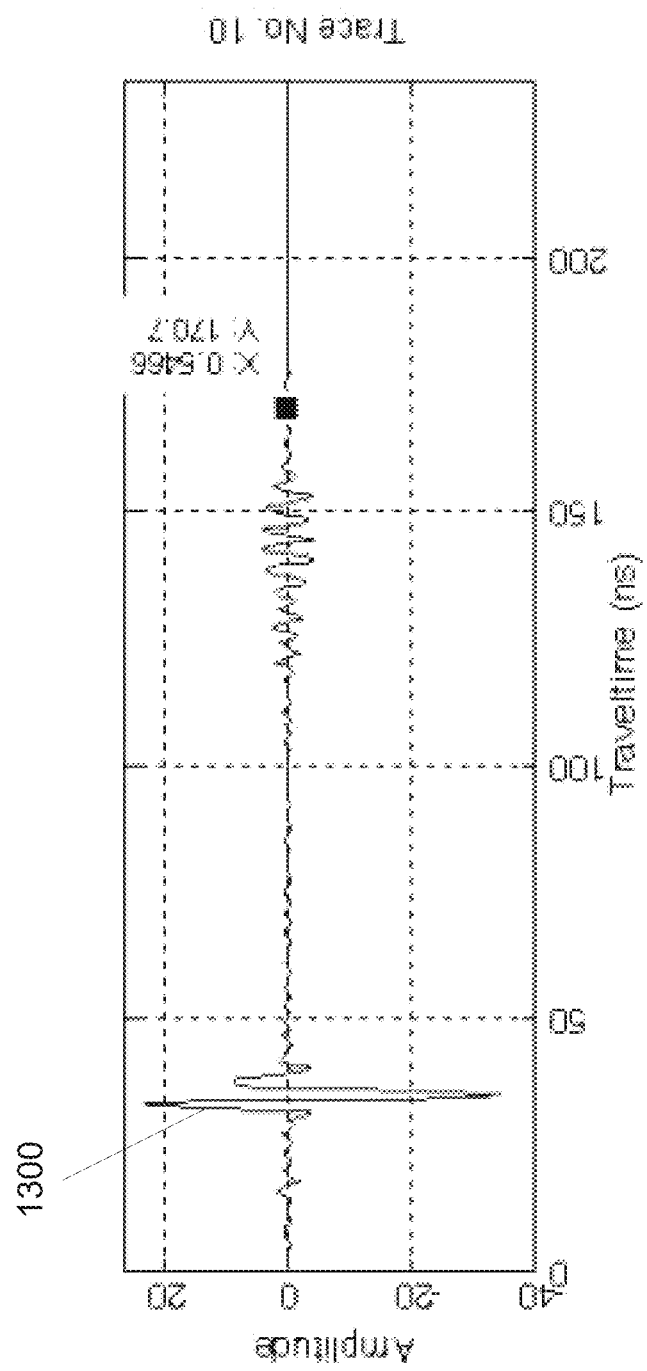
FIG. 13 is a trace showing GPR data through a cavity according to one example.

FIG. 13 is a trace showing GPR through a cavity according to one example. The trace 1300 is extracted from FIG. 12 at x=10 m.

Figure 14:
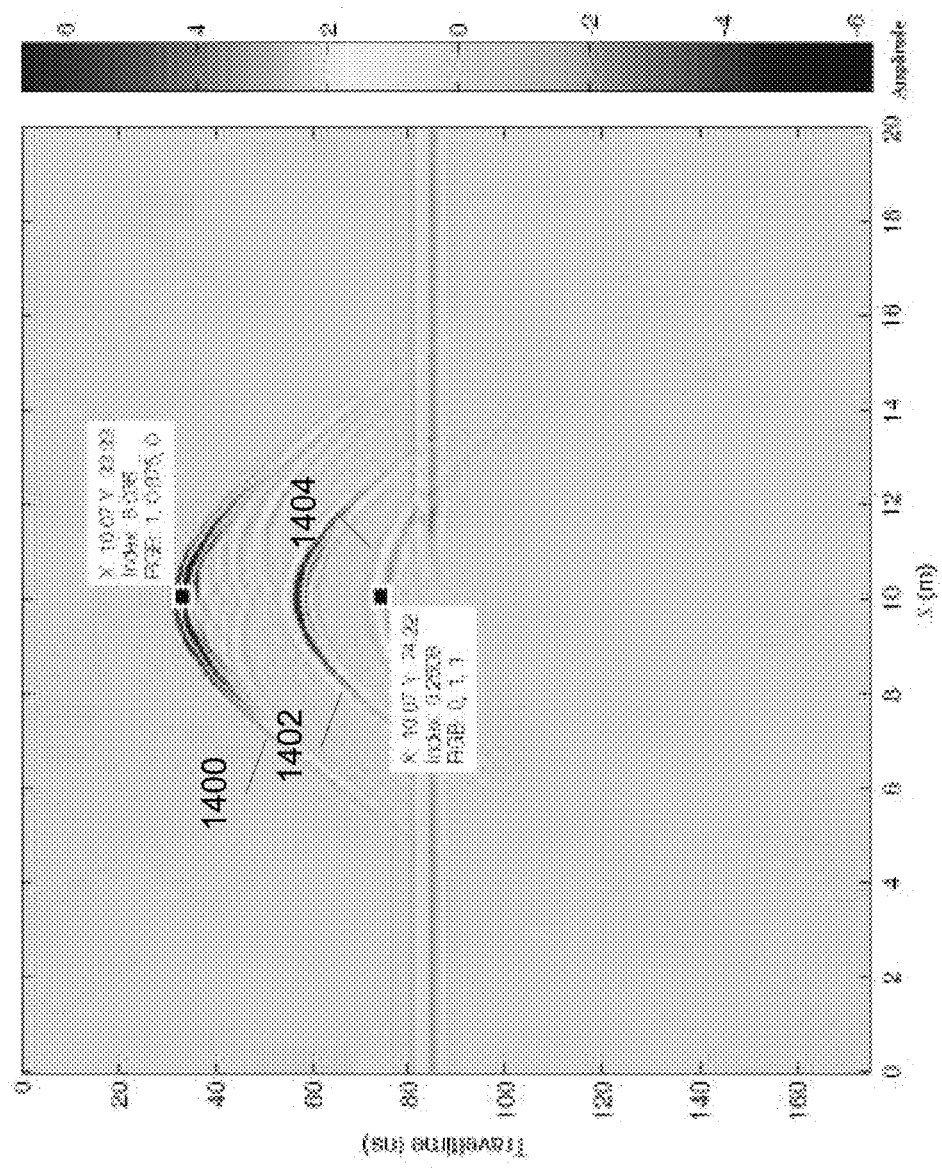
FIG. 14 is a synthetic radargram for a cavity filled with dry sand according to one example.

FIG. 14 is a synthetic radargram for a cavity filled with dry sand according to one example. In this model, the cavity is filled with dry sand, and the porosity may be assumed to be equal to 0.3 and the water saturation is equal to zero. The cavity has a dielectric permittivity of $\epsilon_b$=3.18596, according to CRIM, and the EM wave velocity through the cavity materials is equal to 0.168 m/ns. The synthetic radargram of this model is demonstrated in FIG. 14. FIG. 14 shows that there are three important hyperbolic events. The top hyperbola 1400 is due to the top of the spherical cavity 900. A second hyperbola 1402 is due to the bottom of the spherical cavity 900. A third hyperbola 1404 is reflected from interface directly beneath the cavity at 74.22 ns.

Figure 15:
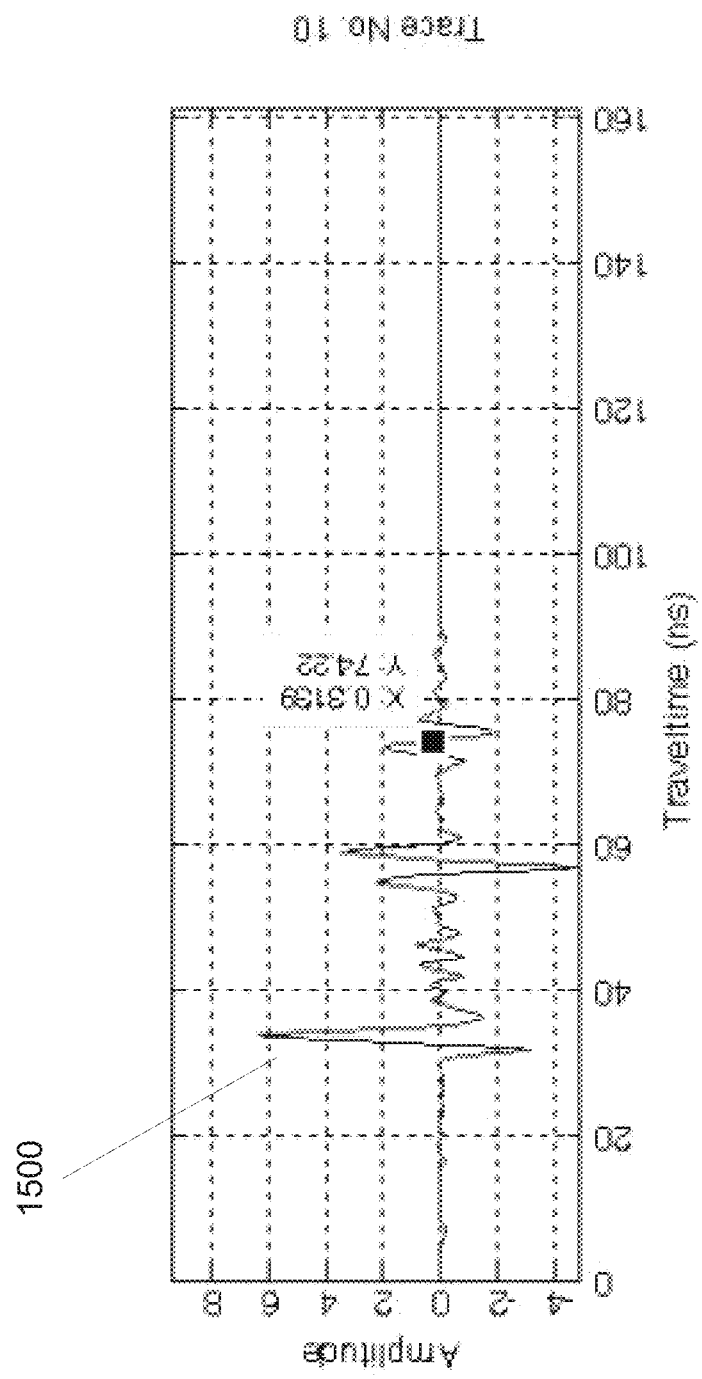
FIG. 15 is a trace showing GPR data through a cavity according to one example.

FIG. 15 is a trace showing GPR data through a cavity according to one example. The trace 1500 is extracted from FIG. 14 at x=10 m.

Figure 16:
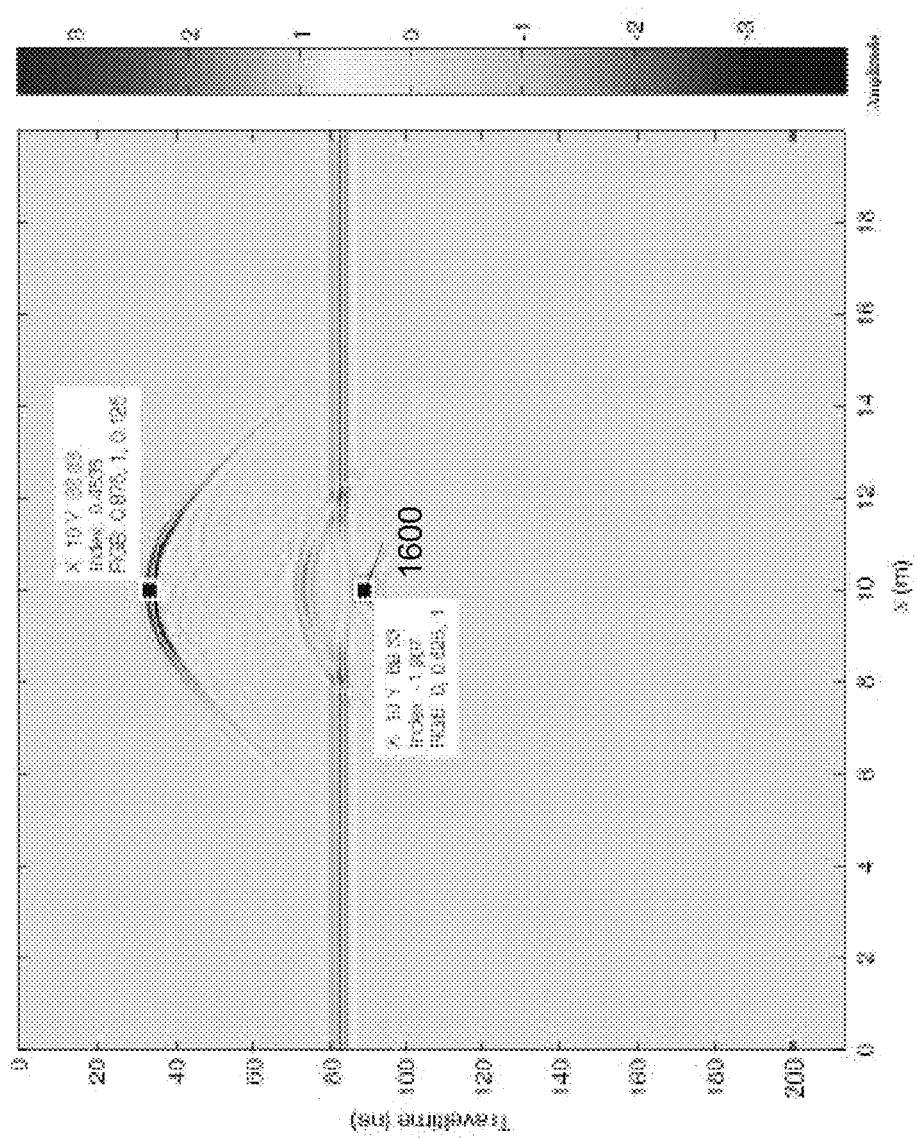
FIG. 16 is a synthetic radargram for a cavity filled with partially saturated sand according to one example.

FIG. 16 is a synthetic radargram for a cavity filled with partially saturated sand according to one example. In this model, the cavity is filled with partially saturated sand, which has a dielectric permittivity of $\epsilon_b$=8.8599 because the assumed porosity and water saturation were 0.3 and 0.5, respectively. The EM wave velocity through the cavity materials is equal to 0.1007 m/ns. The radargram shows that all synthetic interfaces appear clearly, including the cavity edges and the interface. The total travel time from the surface to the interface directly beneath the cavity is 89.33 ns indicated by point 1600.

Figure 17:
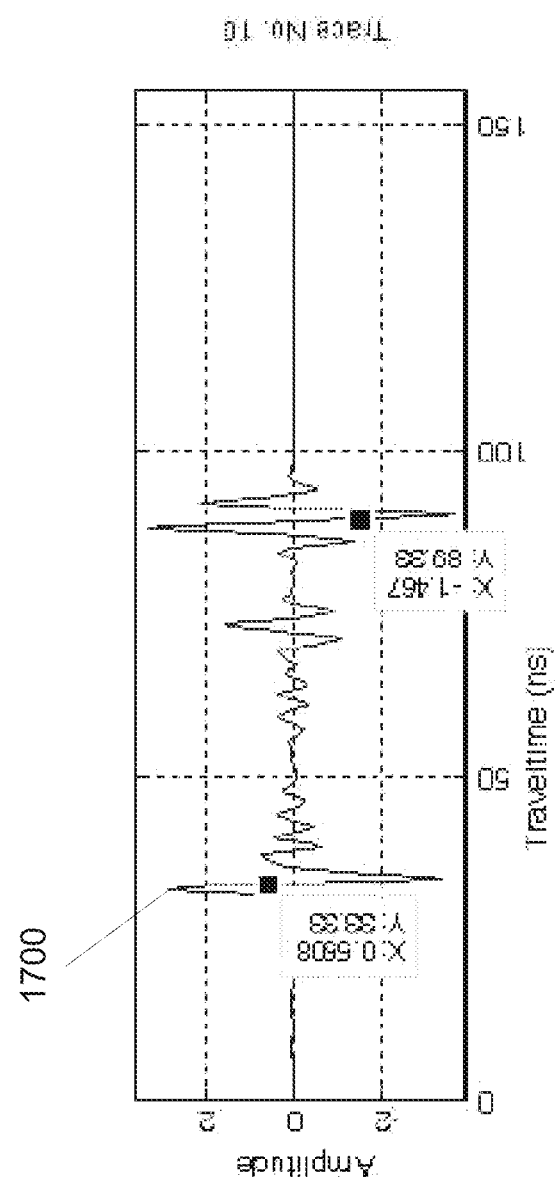
FIG. 17 is a trace showing GPR data through a cavity according to one example.

FIG. 17 is a trace showing GPR data through a cavity according to one example. The trace 1700 is extracted from the data shown in FIG. 16 at x=10 m.

Figure 18:
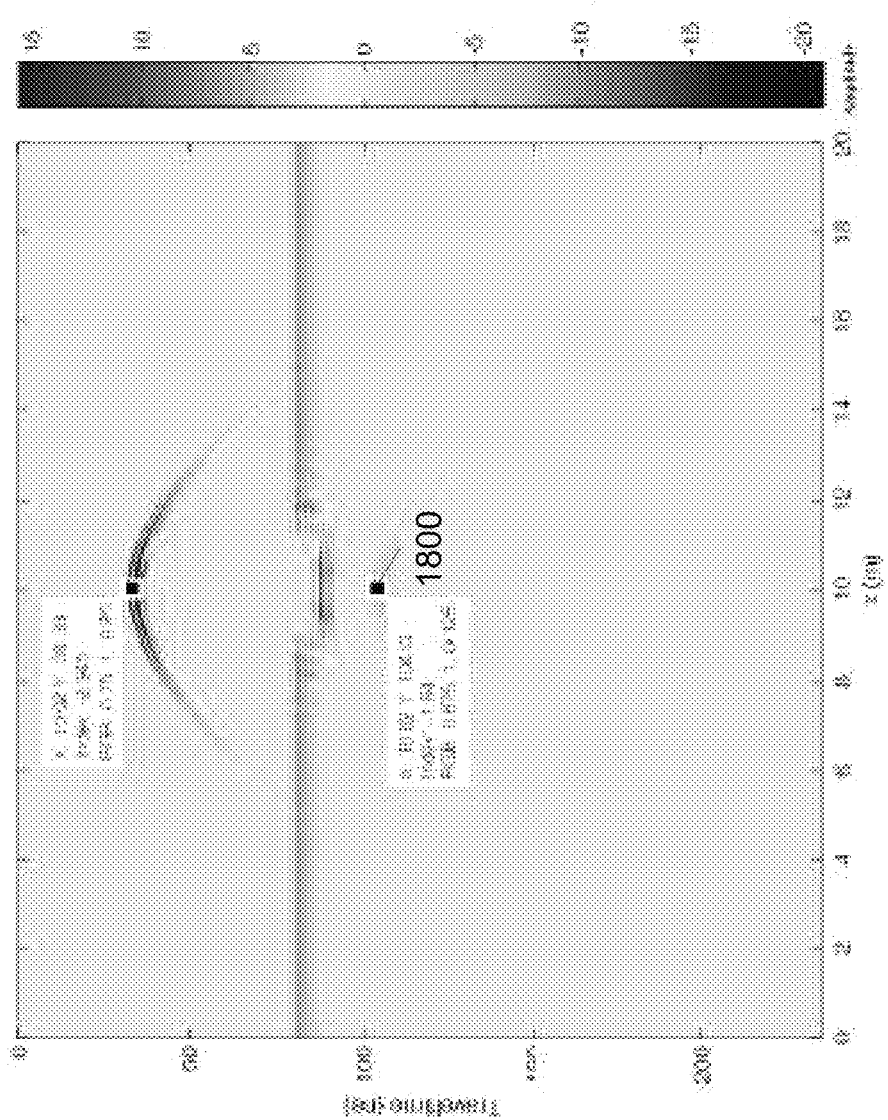
FIG. 18 is a synthetic radargram for a cavity filled with fully saturated sand according to one example.

FIG. 18 is a synthetic radargram for a cavity filled with fully saturated sand according to one example. In this case, the porosity is equal to 0.3, and the water saturation is 1.0. Therefore, it has a dielectric permittivity of $\epsilon_b$=17.374, and the EM wave velocity through the cavity materials is equal to 0.071924 m/ns. The reflections are strong and show the top and bottom boundaries of the cavity, as well as the reflection event from the interface directly beneath cavity at 104.4 ns indicated by point 1800.

Figure 19:
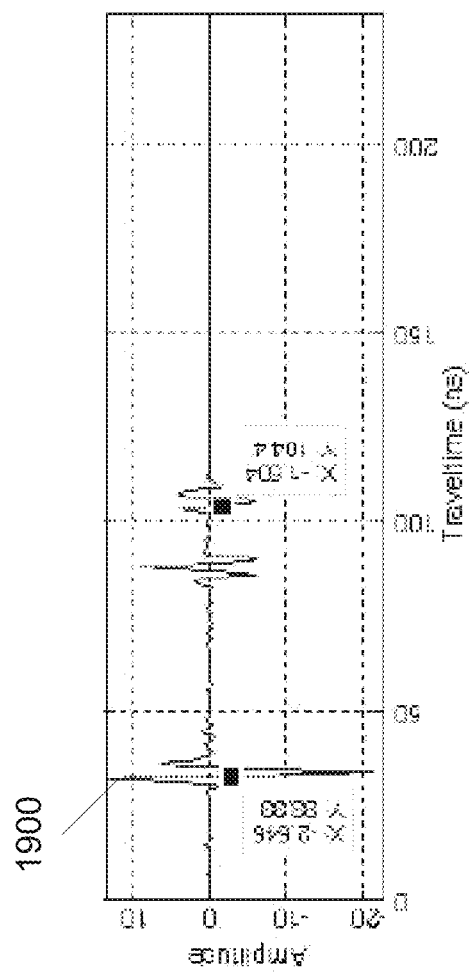
FIG. 19 is a trace showing GPR data through a cavity according to one example.

FIG. 19 is a trace showing GPR data through a cavity according to one example. The trace 1900 is extracted from the data shown in FIG. 18 at x=10 m.

The gravity synthetic data were generated for the five models shown in FIGS. 10-19, via a combination of the analytical expressions for a 2D horizontal slab, which represents a limestone background, and a spherical anomalous body, which represents the target cavity body. A MATLAB function has been written to calculate the Bouguer gravity anomaly for those models. The basic model shown in FIG. 9 is used. The basic model has horizontal and vertical dimensions of 20 m and 10 m, respectively. There is a horizontal interface at 5 m, which separates the upper limestone layer 902 and the lower shale bedrock 904. In addition, there is a spherical cavity 900 in the middle of the upper layer with a radius of 1 m, and its center is located at 3 m depth. For each model, the matrix density was assigned a value of $\rho_g$=2650 kg/m$^3$, the water density was $\rho_w$=1000 kg/m$^3$ and $\rho_a$=1 kg/m$^3$ for the air density. The data generated from these models has already been corrected for Bouguer effects.

Figure 20:
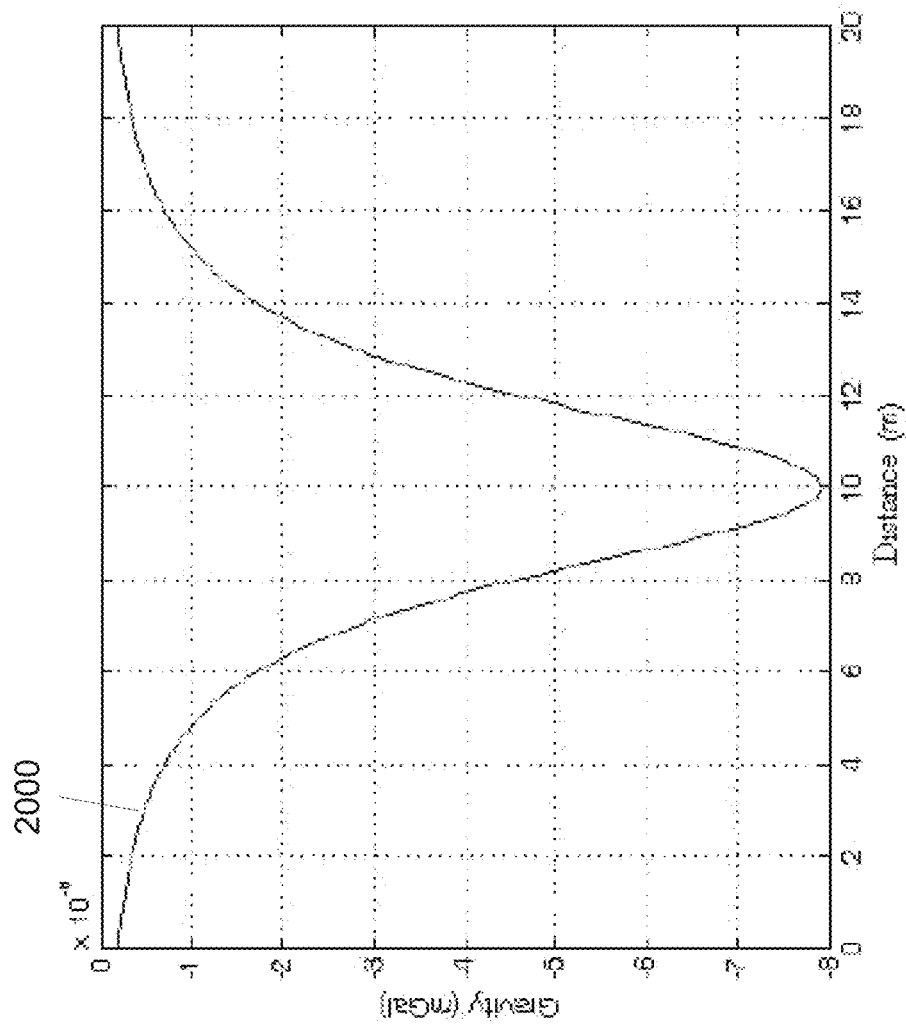
FIG. 20 is a trace that shows a residual anomaly curve over a cavity filled with pure air according to one example.

FIG. 20 is a trace that shows a residual gravity anomaly curve over a cavity filled with pure air according to one example. The gravitational effect of the anomaly in this model can be computed by considering the sum of two simple shapes, a horizontal sheet with a density of 2550 kg/m$^3$ and a thickness of 5 m, which represents the limestone background, and a spherical body with a density of 1 kg/m$^3$ and a radius of 1 m. Trace 2000 shows the residual Bouguer anomaly curve of this model. Trace 2000 shows that the maximum gravity anomaly directly over the center of the cavity is $g_{max}$=0.0000792 μGal.

Figure 21:
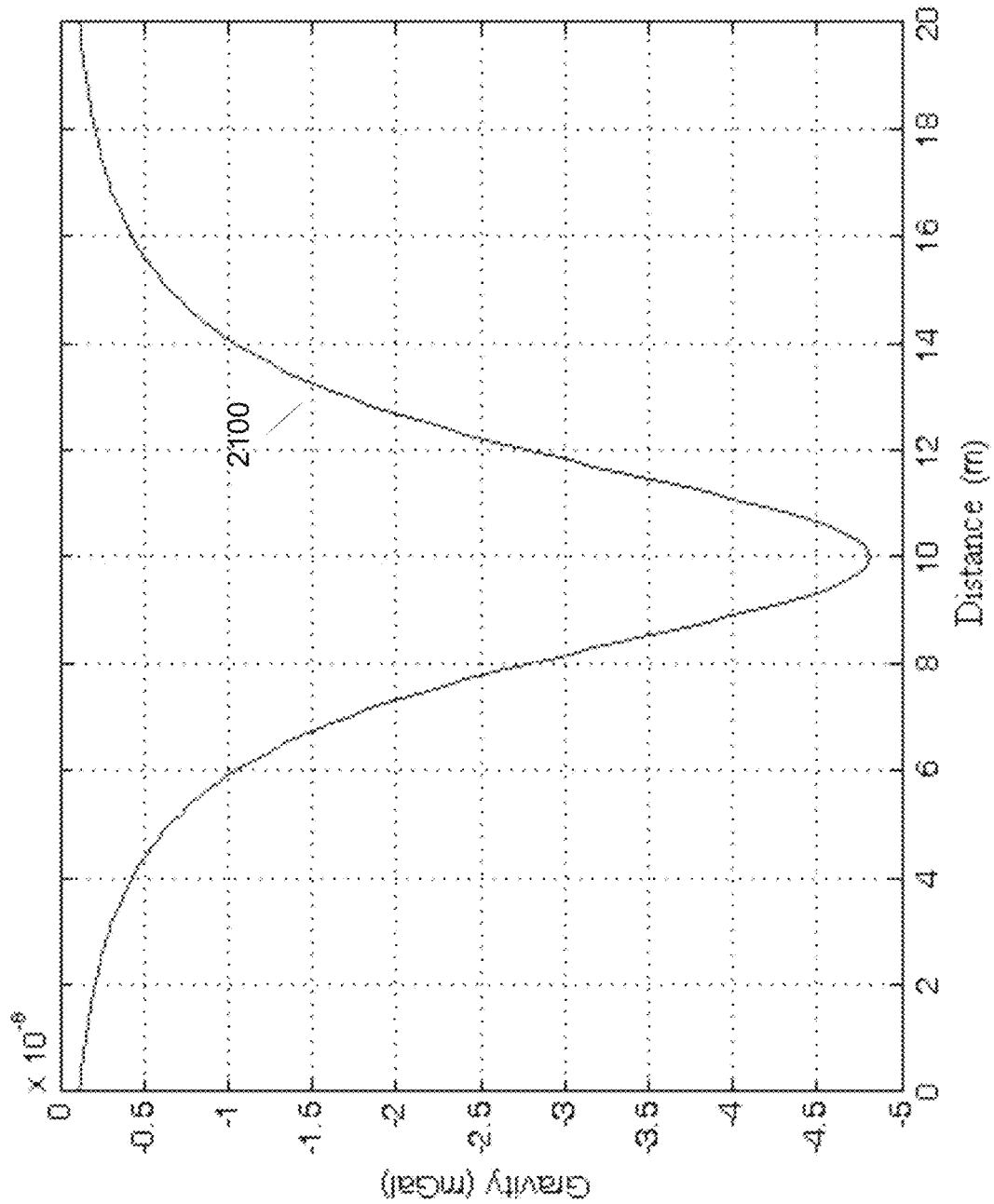
FIG. 21 is a trace that shows a residual gravity anomaly curve over a cavity filled with pure water according to one example.

FIG. 21 is a trace that shows a residual gravity anomaly curve over a cavity filled with pure water according to one example. In this model, the cavity is filled with pure water with a density of 1000 kg/m$^3$, and the surrounding environment has a density of 2550 kg/m$^3$. Trace 2100 shows the residual Bouguer anomaly curve of this model. Hence, there is a density contrast between the cavity and the surrounding limestone, causing a gravity anomaly of $g_{max}$=−0.00004814 μGal, as shown in FIG. 21.

Figure 22:
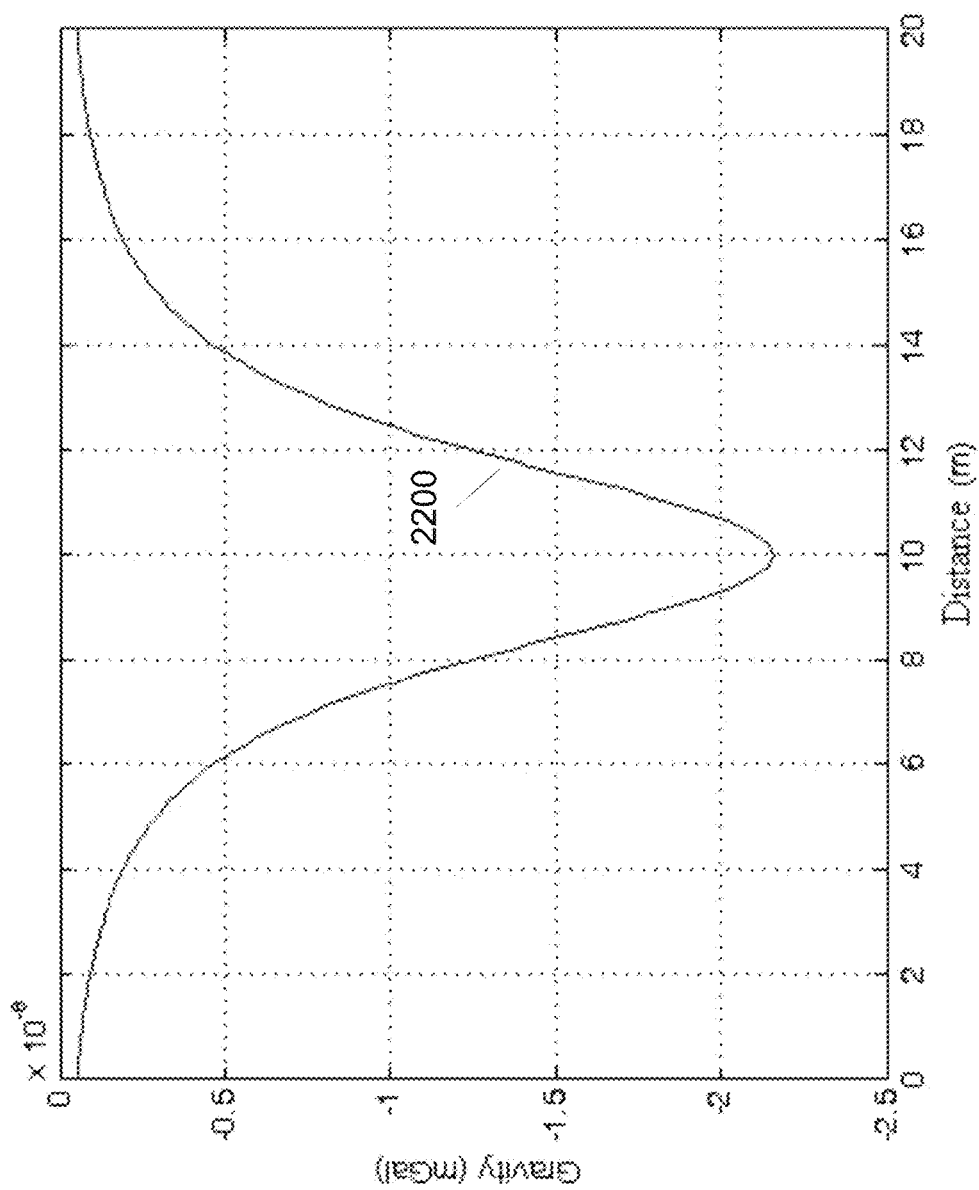
FIG. 22 is a trace that shows a residual gravity anomaly curve over a cavity filled with dry sand according to one example.

FIG. 22 is a trace that shows a residual gravity anomaly curve over a cavity filled with dry sand according to one example. In this model, the cavity is filled with dry sand with a density of 1855.3 kg/m$^3$. This density is calculated by using the porosity-density relationship given by equation (7) with a porosity equal to 0.3, a water saturation equal to zero and the other values held constant. Trace 2200 shows the residual Bouguer anomaly curve of this model. These factors are tabulated in Table 1. The maximum gravity anomaly due to this cavity material is equal to $g_{max}$=0.0000216 μGal, as shown in FIG. 22.

TABLE 1

Synthetic models of cavity materials and background parameters used in the generation of GPR and gravity data.

| | Input parameters $\epsilon_g$ = 4.5, $\epsilon_w$ = 80, $\epsilon_a$ = 1, f = 250 MHz $\rho_g$ = 2650(kg/m$^3$), $\rho_w$ = 1000(kg/m$^3$), $\rho_a$ = 1(kg/m$^3$) | | | | |
|---|---|---|---|---|---|
| Models | $\rho_b$(kg/m$^3$) | V(m/ns) | φ | $S_w$ | $\epsilon_b$ |
| Cavity filled with pure air | 1 | 0.2998 | 1 | 0 | 1 |
| Cavity filled with pure water | 1000 | 0.033518 | 1 | 1 | 80 |
| Cavity filled with dry sand | 1855.3 | 0.168 | 0.3 | 0 | 3.18596 |
| Cavity filled with partially saturated sand | 2005.15 | 0.1007 | 0.3 | 0.5 | 8.8599 |
| Cavity filled with fully saturated sand | 2155 | 0.071924 | 0.3 | 1 | 17.374 |
| Limestone background | 2550 | 0.12 | | | 6.25 |
| Shale bed rock | 2420 | 0.09 | | | 11.111 |

Figure 23:
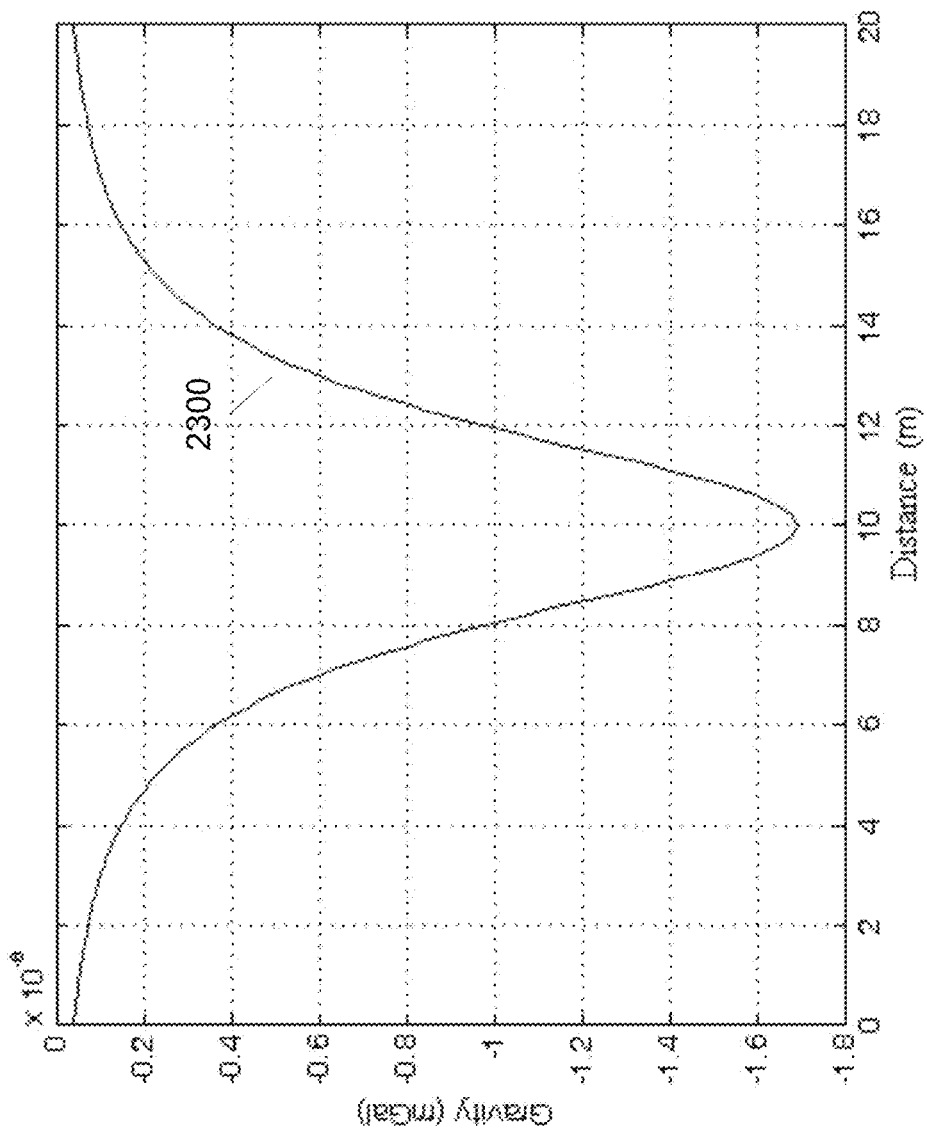
FIG. 23 is a trace that shows a residual gravity anomaly curve over a cavity filled with partially saturated sand according to one example.

FIG. 23 is a trace that shows a residual gravity anomaly curve over a cavity filled with partially saturated sand according to one example. In this model, the cavity is filled with partially saturated sand with a density of 2005.15 kg/m$^3$. This density is calculated by using porosity-density relationship given by equation (7) with a porosity equal to 0.3, a water saturation equal to 0.5 and other values held constant. These factors are tabulated in Table 1. Trace 2300 shows the residual Bouguer anomaly curve of this model. The maximum gravity anomaly due to this cavity material is equal to $g_{max}$=−0.000017 μGal, as shown in FIG. 23.

played in the last four columns of Table 3, which represent the porosity and water saturation values inverted from the five cases using the system of the present disclosure. It also shows the absolute percentage error of these values from the true values assumed in the generation of synthetic data by forward modeling.

TABLE 3

The density and dielectric permittivity values used in forward modelling, synthetic gravity and GPR results and the values of porosity and water saturation calculated by joint inversion approach with errors.

| | Output gravity Picking from residual gravity curve | | Output travel time from radargram Picking from synthetic GPR data | | Output parameters | | Absolute percentage error (%) | |
|---|---|---|---|---|---|---|---|---|
| Models | $g_z$ (μGal) | $x_{1/2}$ (m) | $T_{top}$ (ns) | $T_c$ (ns) | φ | $S_w$ | φ(%) | $S_w$ (%) |
| Cavity filled with pure air | −0.0000792 | 2.3 | 34.22 | 63.56 | 1.01587 | 0.00206 | 1.6 | 0.21 |
| Cavity filled with pure water | −0.0000481 | 2.3077 | 34.22 | 170.7 | 1.00657 | 1.00753 | 0.7 | 0.8 |
| Cavity filled with dry sand | −0.0000216 | 2.3014 | 34.22 | 74.22 | 0.304795 | 0.01162 | 1.6 | 1.16 |
| Cavity filled with partially saturated sand | −0.000017 | 2.3 | 33.33 | 89.33 | 0.30229 | 0.48801 | 0.76 | 2.4 |
| Cavity filled with fully saturated sand | −0.0000123 | 2.31 | 33.33 | 104.4 | 0.29499 | 0.97499 | 1.67 | 2.51 |

Figure 24:
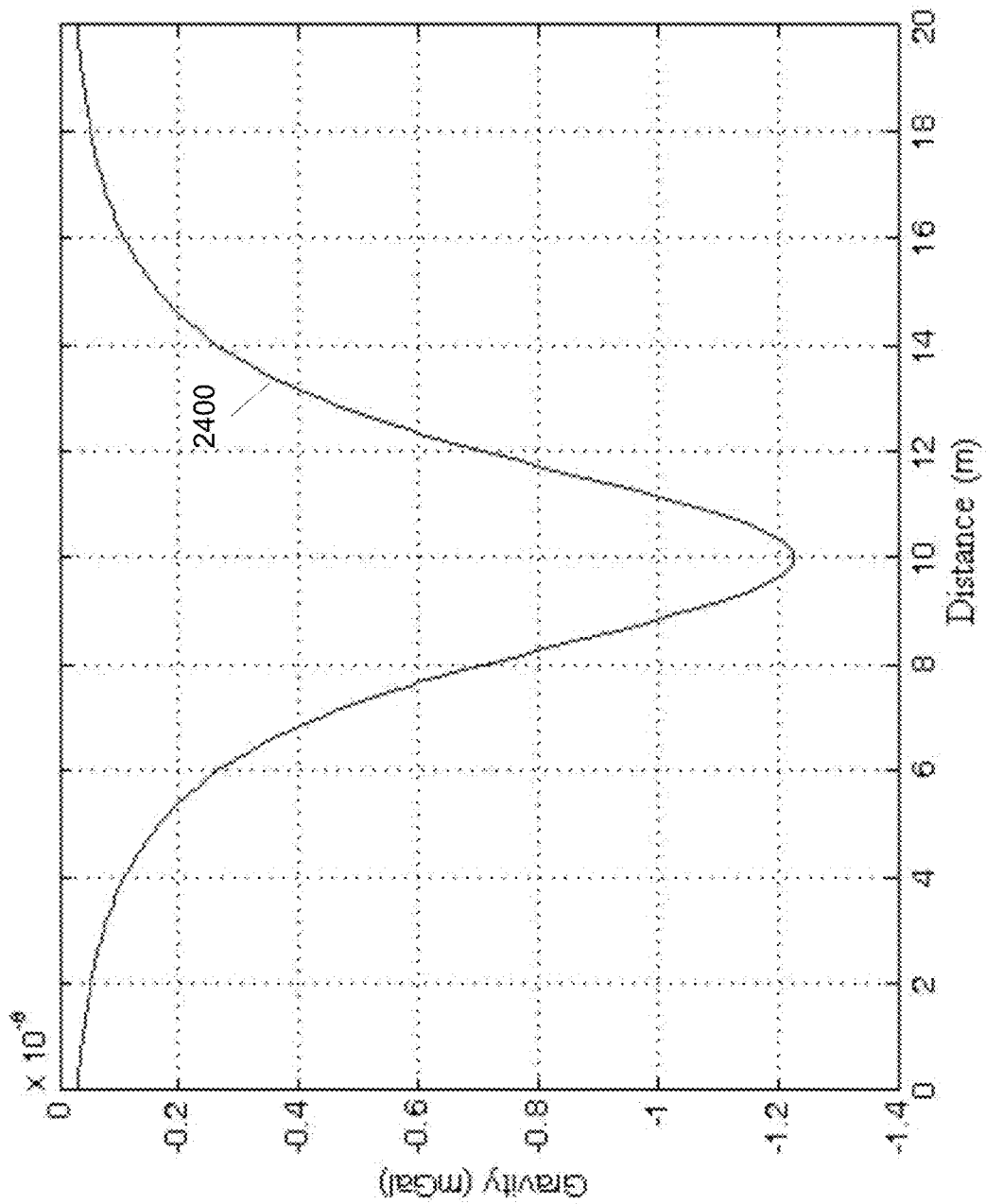
FIG. 24 is a trace that shows a residual gravity anomaly curve over a cavity filled with fully saturated sand according to one example.

FIG. 24 is a trace that shows a residual gravity anomaly curve over a cavity filled with fully saturated sand according to one example. In this case, the cavity is filled with fully saturated sand, and the density of the cavity material is 2155 kg/m³ because the porosity and water saturation were 0.3 and 1, respectively. Trace 2400 shows the residual Bouguer anomaly curve of this model. Therefore, the maximum gravity anomaly value directly above the cavity is $g_{max}$=−0.0000123 μGal, as shown in FIG. 24. Finally, the extracted information from the radargrams and the Bouguer gravity anomaly curves for all synthetic models are summarized in Table 2.

TABLE 2

Extracted information from radargrams and Bouguer anomaly curves required for inversion.

| Models | Gravity anomaly (MicroGal) | X(½) (m) | Tc (ns) |
|---|---|---|---|
| Cavity filled with pure air | −0.0000792 | 2.3 | 63.56 |
| Cavity filled with pure water | −0.0000481 | 2.3077 | 170.7 |
| Cavity filled with dry sand | −0.0000216 | 2.3014 | 74.22 |
| Cavity filled with partially saturated sand | −0.00017 | 2.3 | 89.33 |
| Cavity filled with fully saturated sand | −0.0000123 | 2.31 | 104.4 |

The total travel time ($T_c$) from the surface to the interface directly beneath the cavity is picked from radargram and the maximum gravity anomaly ($g_{max}$) directly above the cavity is deduced from the residual Bouguer gravity anomaly over the cavity. Both of these parameters are summarized in Table 3. These two important parameters are used in the inversion of porosity and water saturation values using equations (28) and (29). The system is verified using the five different cases of cavity materials described above. The results are dis- In the first model, in which the cavity is filled with pure air, the assumed values for porosity and water saturation were 1 and zero, respectively, in the forward modeling. After the method of the present disclosure is applied a porosity of 1.01587 and a water saturation value of 0.00206 are obtained at step S608 and step S610 respectively. Therefore, the absolute percentage error in this case was 1.6% and 0.21% for porosity and water saturation values, respectively. In the second case, in which the cavity is filled with water, the values of the porosity and water saturation used in the forward modeling were 1 and 1, respectively. Therefore, the inverting process using equations (28) and (29) resulted in a porosity of 1.00657 and a water saturation of 1.00753. The corresponding absolute percentage errors are 0.7% and 0.8% for porosity and water saturation, respectively. In model 3, in which the cavity is filled with dry sand, the true value of porosity was 0.3, and the water saturation was zero. Applying joint inversion approach to estimate porosity and water saturation, a porosity of 0.304795 and a water saturation of 0.011623 are obtained. The corresponding absolute percentage errors were 1.6% for porosity and 1.16% for water saturation.

In the same manner, the input parameters of porosity and water saturation in the forward modeling of a cavity filled with partially saturated sand are 0.3 and 0.5, respectively. The output results using equations (28) and (29) are 0.30229 for porosity and 0.48801 for water saturation, giving absolute percentage errors of 0.76% in porosity and 2.4% in water saturation. Finally, for the case in which the cavity is filled with fully saturated sand, the input porosity and water saturation values are 0.3 and 1, respectively. The values from the joint inversion approach for this case are 0.29499 for porosity and 0.97493 for water saturation. The corresponding absolute percentage errors are 1.67% for porosity and 2.51% for water saturation. All the results for porosity and water saturation from the different scenarios are acceptable and have high accuracy. For all cases, the error is always less than 2.51%. Moreover, for water saturation and porosity the highest errors are 2.51% and 1.67% and the lowest errors are 0.2% and 0.7%, respectively.

The system and associated methodology of the present disclosure provides a reliable method to estimate porosity and water saturation for cavity-filling materials. The method commonly provides enough information to obtain a general view of the cavity's contents, and this information could be used to characterize possible hazards associated with this cavity. The system of the present disclosure may be used to help engineers estimate and calculate many geotechnical parameters that depend on these petrophysical parameters.

The porosity-density relationship expresses the bulk density of the materials in terms of fluids and matrix densities, whereas the CRIM describes the bulk permittivity of a composite material in terms of the dielectric permittivities of its constituent grains and fluids. In addition, the empirical constants in the CRIM and porosity-density relationship might be unknown or difficult to determine for a given survey area. Therefore, the effects of using incorrect petrophysical parameters (i.e., density and dielectric permittivity of the grains or matrix) are investigated using the system of the present disclosure.

The main unknowns when using the system of the present disclosure are the values of density and dielectric permittivity of the grains of the material within the cavity, which are then used to estimate the porosity and water saturation of the material. Therefore, to measure the sensitivity of the system and method to incorrect density and permittivity values, a sensitivity analysis is conducted.

Figure 25:
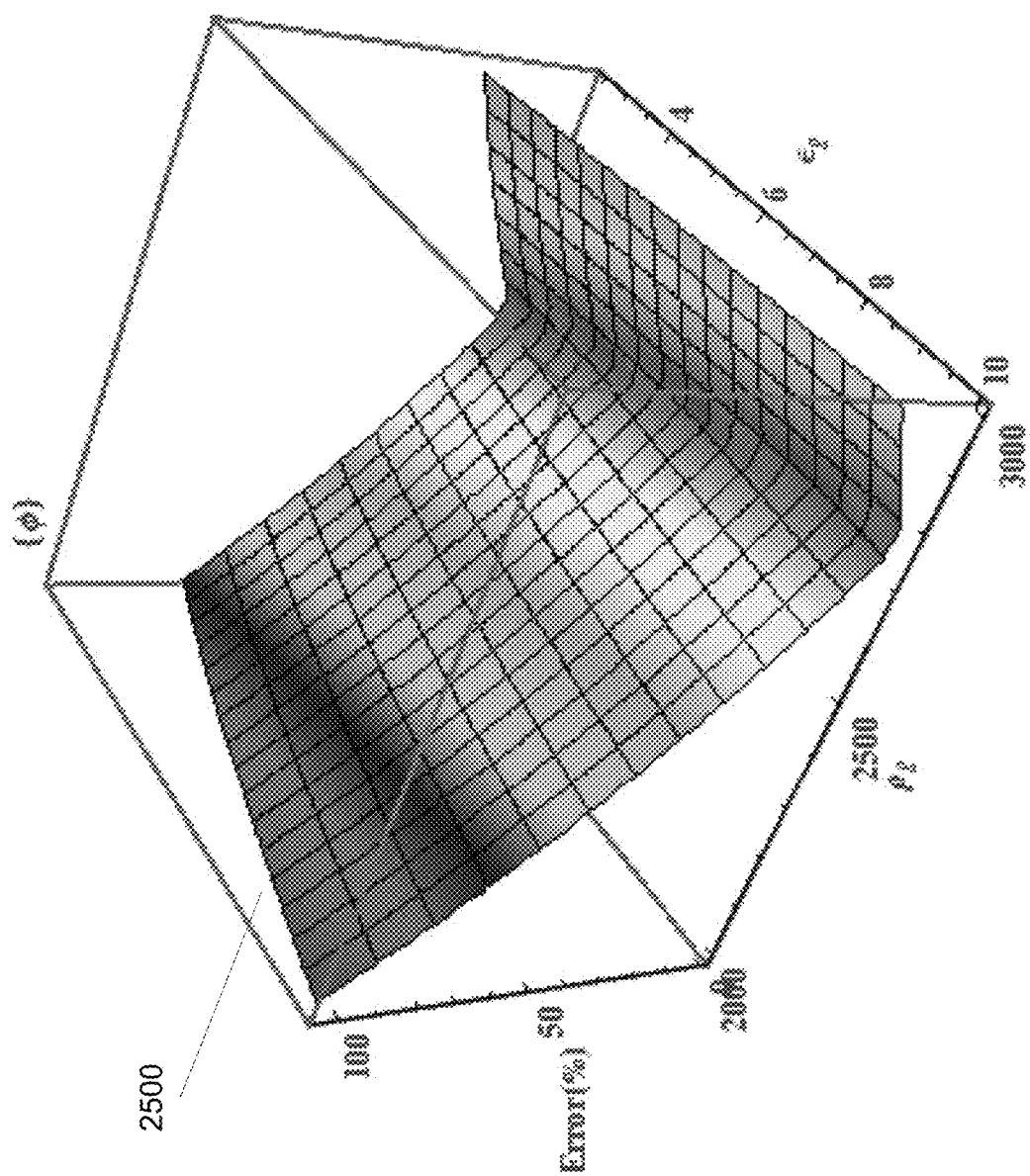
FIG. 25 is a 3D plot that shows the absolute percentage error in porosity as a function of matrix density and dielectric permittivity according to one example.
Figure 26:
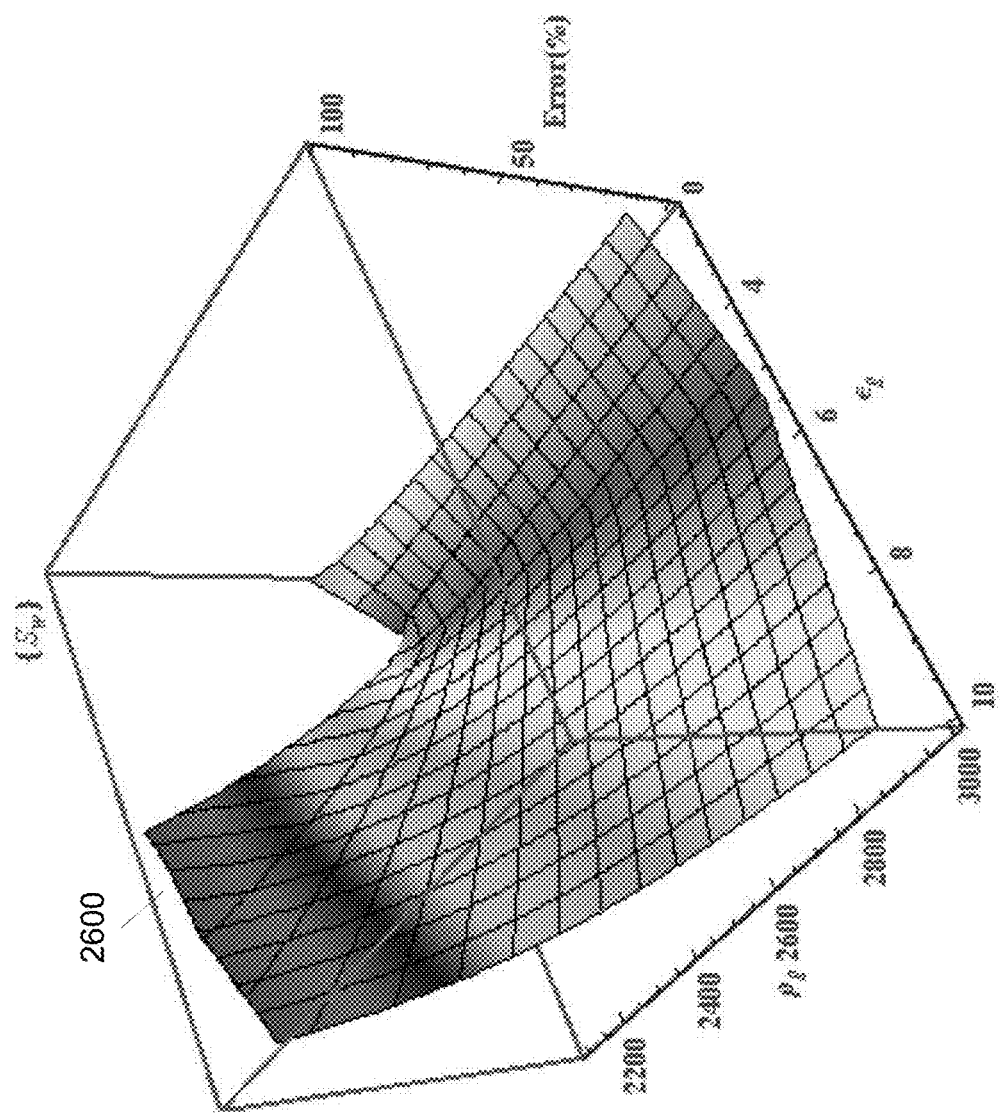
FIG. 26 is a 3D plot that shows an absolute percentage error in water saturation of matrix density and dielectric permittivity according to one example.

The changes in the porosity and water saturation values due to using incorrect matrix densities and dielectric permittivities were calculated for the cavity filled with materials through joint inversion approach of GPR and gravity data sets. FIGS. 25 and 26 show 3D plots of the absolute percentage errors in porosity and water saturation estimations as functions of different values of matrix densities and dielectric permittivities.

The range of the matrix density is between 2100 kg/m$^3$ and 3000 kg/m$^3$, which includes most shallow rocks, while the true value in the tested models was 2650 kg/m$^3$. The range of the matrix dielectric permittivity varies from 2.5 to 10, which represents most sediments, while the true value for the tested models was 4.5.

FIG. 25 is a 3D plot that shows the absolute percentage error in porosity as a function of matrix density and dielectric permittivity according to one example. The 3D plot 2500 shows the distribution of absolute percentage error in estimated porosity associated with various values of matrix density and dielectric permittivity. The absolute percentage errors increase with deviation from the true values of $\rho_g$ and $\epsilon_g$. The smallest absolute percentage error in porosity values occurs between a matrix density of 2600 kg/m$^3$ and 2800 kg/m$^3$ along the density axis. Therefore, the smallest error lies around the true value used in the inversion operation. The sensitivity plot shows that the inverted porosity by the system and associated methodology of the present disclosure is more sensitive to the matrix density than dielectric permittivity.

FIG. 26 is a 3D plot that shows an absolute percentage error in water saturation of matrix density and dielectric permittivity according to one example. A 3D plot 2600 represents the absolute percentage errors in water saturation associated with various values of matrix density and dielectric permittivity. It is clear that the absolute percentage error increases gradually with increasing matrix dielectric permittivity and decreasing matrix density from the true values of $\rho_g$ and $\epsilon_g$. The smallest absolute percentage error in water saturation occurs between a matrix dielectric permittivity of 3.5 and 5 along permittivity axis. Therefore, the smallest error lies around the true value used in the inversion operation which is 4.5. In addition, the sensitivity plot shows that the inverted water saturation by the system of the present disclosure is more sensitive to errors in matrix dielectric permittivity than matrix density.

The development and characterization of a new GPR and gravity joint inversion method has been presented in this disclosure. The system is validated to estimate porosity and water saturation for the material inside a cavity through synthetic data. The system of the present disclosure is able to provide an accurate value of porosity and water saturation for cavity filling materials. Petrophysical models that link bulk dielectric permittivity and bulk density with porosity and water saturation parameters have been presented. These factors are used in a quantitative joint inversion approach to estimate porosity and water saturation from GPR and gravity measurements. The GPR synthetic data may be computed using a 2D split-step algorithm which requires the solution of Maxwell's equations in the frequency domain. The 2D split-step algorithm is implemented via the MATGPR software. Additionally, the synthetic gravity anomaly curves are generated using MATLAB functions through analytical expressions for an earth model composed of a 2D horizontal slab which represents the background rock and a spherical body that represents the cavity.

The basic cavity model used in this disclosure consists of horizontal and vertical dimensions of 20 m and 10 m, respectively with a horizontal interface at depth of 5 m which separates an upper limestone bed from a lower shale bedrock. Other models may be used to validate the system. In addition, there is a spherical cavity with 1 m radius with its center located at 3 m in depth and 10 m horizontal distance. Equations (28) and (29) may be used by the system to determine the porosity and water saturation of cavity-filling materials through the joint inversion of GPR and gravity data sets. This approach was successfully applied to synthetic GPR and gravity data for various spherical cavity materials. More specifically, exemplary results from five synthetic models have been presented. The materials within cavity are composed of air, water, dry sand, partially saturated sand or fully saturated sand.

The system has a high accuracy results for all cases. The error was always less than 2.51%. Moreover, for water saturation and porosity the highest errors are 2.51% and 1.67%, respectively; whereas the lowest errors are 0.2% and 0.7%, respectively.

The system and associated methodology of the present disclosure contribute to the characterization of the cavity phenomena, covering the detection of the porosity and water saturation of cavity material. The method of the present disclosure is efficient in calculating the porosity and water saturation for a spherical cavity shape. The developed methodology provides accurate results when applied to simulated datasets. However, the result produced by the joint inversion is sensitive to incorrect matrix density and dielectric permittivity values used in inverting porosity and water saturation parameters for materials inside the cavity. If no matrix permittivity and density data are available, this approach might result in high errors in the estimated parameters. One has to be careful in collecting field data and in dealing with the correction of microgravity anomalies due to the effects of topographic variation and precision of the gravimeter when detecting the very small anomalies associated with cavities.

Although, in one embodiment, the cavity is considered spherical other shapes such as irregular shape, horizontal sheet or any other shape may be used. Consequently, porosity and water saturation can be determined with the joint inversion approach of GPR and gravity data sets. In other embodiments, the system and associated methodology may be used with multiple cavities.

The GPR and gravity joint inversion approach can be used to estimate porosity and water saturation for non-spherical cavity such as irregular shapes. In other embodiments, instead of CRIM, another rock-physics model can be used such as Topp's equation and Bruggeman-Hanai-Sen (BHS) model. The methodology developed here is not only restricted to GPR and gravity techniques but it also can be extended to include other geophysical tools such as seismic and electrical resistivity. In addition, this approach can be used with three or more techniques that are sensitive to the same subsurface petrophysical quantities. Thus, any group of geophysical data sets that have a common petrophysical link can be inverted using the system and associated methodology of the present disclosure. The system of the present disclosure may be further programmed to execute any algorithm and method disclosed in "Joint inversion of gravity and ground penetrating radar data to characterize subsurface cavities" by Fathi M. S. Abdullah, master thesis, King Fand University of Petroleum & Minerals, Dhahran, Saudi Arabia. May 2014, the entire disclosure of which is incorporated herein by reference.

Obviously, numerous modifications and variations are possible in light of the above teachings. It is therefore to be understood that within the scope of the appended claims, the invention may be practiced otherwise than as specifically described herein.

Next, a hardware description of the server 100 according to exemplary embodiments is described with reference to FIG. 27. In FIG. 27, the server 100 includes a CPU 2700 which performs the processes described above. The process data and instructions may be stored in memory 2702. These processes and instructions may also be stored on a storage medium disk 2704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 100 communicates, such as a server or computer.

Further, the claimed advancements may be provided as a utility application, background daemon, or component of an operating system, or combination thereof, executing in conjunction with CPU 2700 and an operating system such as Microsoft Windows 7, UNIX, Solaris, LINUX, Apple MAC-OS and other systems known to those skilled in the art.

CPU 2700 may be a Xenon or Core processor from Intel of America or an Opteron processor from AMD of America, or may be other processor types that would be recognized by one of ordinary skill in the art. Alternatively, the CPU 2700 may be implemented on an FPGA, ASIC, PLD or using discrete logic circuits, as one of ordinary skill in the art would recognize. Further, CPU 2700 may be implemented as multiple processors cooperatively working in parallel to perform the instructions of the inventive processes described above.

The server 100 in FIG. 27 also includes a network controller 2706, such as an Intel Ethernet PRO network interface card from Intel Corporation of America, for interfacing with network 102. As can be appreciated, the network 102 can be a public network, such as the Internet, or a private network such as an LAN or WAN network, or any combination thereof and can also include PSTN or ISDN subnetworks. The network 102 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 100 further includes a display controller 2708, such as a NVIDIA GeForce GTX or Quadro graphics adaptor from NVIDIA Corporation of America for interfacing with display 2710, such as a Hewlett Packard HPL2445w LCD monitor. A general purpose I/O interface 2712 interfaces with a keyboard and/or mouse 2714 as well as a touch screen panel 2716 on or separate from display 2710. General purpose I/O interface also connects to a variety of peripherals 2718 including printers and scanners, such as an OfficeJet or DeskJet from Hewlett Packard.

A sound controller 2720 is also provided in the server 100, such as Sound Blaster X-Fi Titanium from Creative, to interface with speakers/microphone 2722 thereby providing sounds and/or music.

The general purpose storage controller 2724 connects the storage medium disk 2704 with communication bus 2726, which may be an ISA, EISA, VESA, PCI, or similar, for interconnecting all of the components of the sever 100. A description of the general features and functionality of the display 2710, keyboard and/or mouse 2714, as well as the display controller 2708, storage controller 2724, network controller 2706, sound controller 2720, and general purpose I/O interface 2712 is omitted herein for brevity as these features are known.

A system which includes the features in the foregoing description provides numerous advantages to users. In particular, the method and system determine the porosity and water saturation of a material inside the cavity. The present disclosure has the advantage of finding the porosity and water saturation with high accuracy. Thus, the present disclosure provides an improvement to the technical field by finding the porosity and water saturation with high accuracy using GPR and gravity data. In addition, the present disclosure has the advantage of finding both the porosity and water saturation simultaneously thus minimizing computation.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for characterizing subsurface cavities and drilling based on porosity, the method comprising:
receiving, via a network, ground penetrating radar measurements in a radiowave band from a ground penetrating radar device storing physical constants;
receiving, via the network, a gravity profile from a microgravity device that transmits the gravity profile, wherein the microgravity device has communication circuitry to transmit the gravity profile to the network;

calculating, using processing circuitry, a porosity of cavity filling materials based on the ground penetrating radar measurements and the gravity profile using a data inversion approach;

calculating a water saturation of the cavity filling materials based on the ground penetrating radar measurements and the gravity profile using the data inversion approach;

sending the porosity and the water saturation to an external device to provide geological characterizing of the subsurface cavities to host applications; and drilling in a location based on the calculated porosity and the water saturation.

2. The method of claim 1, wherein the subsurface cavities are spherical.

3. The method of claim 2, further comprising:

calculating the porosity as a function of a half width of a gravity anomaly curve, a travel time from ground surface to bottom of a host layer through center of the cavity, an electromagnetic wave velocity through the host layer, a distance from ground surface to the top of the cavity, a thickness of the host layer, densities of the cavity filling materials and permittivities of the cavity filling materials.

4. The method of claim 3, wherein the porosity is calculated using $$\phi = \frac{CM - AD}{CN - BD}$$

where $$A = \frac{1.27(x_{1/2})^2 g_{max}}{\pi G (1.305 x_{1/2} - H_{s1})^3} + \rho_s - \rho_g,$$

$B=\rho_a-\rho_g$, $C=\rho_w-\rho_a$, $D=\sqrt{\varepsilon_w}-\sqrt{\varepsilon_a}$, and $N=\sqrt{\varepsilon_a}-\sqrt{\varepsilon_g}$ where $x_{1/2}$ is the half-width of the anomaly curve, $g_{max}$ is the maximum gravity anomaly, G is the universal gravitational constant, $\rho_s$, $\rho_g$, $\rho_a$, $\rho_w$, $\varepsilon_a$, $\varepsilon_w$ and $\varepsilon_g$ are geophysical constants, $v_s$ is the velocity, $T_c$ is the travel time, and $H_s$ and $H_{s1}$ are constants.

5. The method of claim 3, wherein the densities of the cavity filling materials and the permittivities of the cavity filling materials are stored in a memory.

6. The method of claim 5, wherein the water saturation is calculated using $$S_w = \frac{-BM + AN}{CN - BD}$$

where $$A = \frac{1.27(x_{1/2})^2 g_{max}}{\pi G (1.305 x_{1/2} - H_{s1})^3} + \rho_s - \rho_g,$$

$B=\rho_a-\rho_g$, $C=\rho_w-\rho_a$, $D=\sqrt{\varepsilon_w}-\sqrt{\varepsilon_a}$, $$M = \frac{0.3(v_s T_c - 2H_s + 4(1.305 x_{1/2} - H_{s1}))}{4 v_s (1.305 x_{1/2} - H_{s1})} - \sqrt{\varepsilon_g}$$

and $N=\sqrt{\varepsilon_a}-\sqrt{\varepsilon_g}$ where $x_{1/2}$ is the half-width of the anomaly curve, $g_{max}$ is the maximum gravity anomaly, G is the universal gravitational constant, $\rho_s$, $\rho_g$, $\rho_a$, $\rho_w$, $\varepsilon_a$, $\varepsilon_w$ and $\varepsilon_g$ are geophysical constants, $v_s$ is the velocity, $T_c$ is the travel time, and $H_s$ and $H_{s1}$ are constants.

7. The method of claim 2, further comprising:

calculating the water saturation as a function of a half width of a gravity anomaly curve, a travel time from ground surface to bottom of a host layer through center of the cavity, an electromagnetic wave velocity through the host layer, a distance from ground surface to the top of the cavity, a thickness of the host layer, densities of the cavity filling materials and permittivities of the cavity filling materials.

8. The method of claim 7, wherein the densities of the cavity filling materials and the permittivities of the cavity filling materials are stored in a memory.

9. The method of claim 1, wherein the ground penetrating radar measurements are used without calculating a velocity tomogram.

* * * * *